(12) United States Patent
Oizumi

(10) Patent No.: US 7,268,845 B2
(45) Date of Patent: Sep. 11, 2007

(54) TRANSFLECTIVE LIQUID CRYSTAL DISPLAY DEVICE HAVING FOUR RETARDATION PLATES

(75) Inventor: Mitsuo Oizumi, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 74 days.

(21) Appl. No.: 11/318,072

(22) Filed: Dec. 23, 2005

(65) Prior Publication Data
US 2006/0139534 A1    Jun. 29, 2006

(30) Foreign Application Priority Data
Dec. 27, 2004    (JP) .............................. 2004-375485

(51) Int. Cl.
*G02F 1/1335*    (2006.01)
(52) U.S. Cl. ...................... 349/119; 349/114; 349/117; 349/118
(58) Field of Classification Search ................. 349/119
See application file for complete search history.

(56) References Cited

U.S. PATENT DOCUMENTS

| | | | |
|---|---|---|---|
| 6,707,519 B1 | 3/2004 | Okumura et al. | |
| 6,999,144 B2 * | 2/2006 | Wu et al. | 349/114 |
| 7,110,071 B2 * | 9/2006 | Matsushima | 349/114 |
| 2003/0210365 A1 | 11/2003 | Koyama et al. | |
| 2004/0233358 A1 | 11/2004 | Wu | |
| 2005/0134773 A1 * | 6/2005 | Park et al. | 349/117 |

FOREIGN PATENT DOCUMENTS

JP    2000-171794    6/2000

OTHER PUBLICATIONS

A Search Report dated Apr. 4, 2006 for corresponding European Application No. 05028240.9.

* cited by examiner

*Primary Examiner*—David Nelms
*Assistant Examiner*—Michael H. Caley
(74) *Attorney, Agent, or Firm*—Brink Hofer Gilson & Lione

(57) ABSTRACT

A liquid crystal display device includes a liquid crystal cell having a pair of transparent substrates opposite to each other and a liquid crystal layer provided between the pair of substrates; first and second retardation plates and a first polarizing plate that are sequentially formed on an outer surface of one of the pair of substrates; and third and fourth retardation plates and a second polarizing plate that are sequentially formed on an outer surface of the other substrate of the pair of substrates. Optical characteristics of the liquid crystal cell, the first to fourth retardation plates, and the first and second polarizing plates are set in predetermined ranges.

28 Claims, 10 Drawing Sheets

TRANSFLECTIVE LIQUID CRYSTAL DISPLAY DEVICE HAVING FOUR RETARDATION PLATES

BACKGROUND OF THE INVENTION

1. Field of the Invention

The present invention relates to a liquid crystal display device, and more particularly, to a liquid crystal display device in which reflective portions and transmissive portions are provided in a liquid crystal cell.

2. Description of the Related Art

In the field of a display device, an active matrix display device capable of obtaining high display quality has come into widespread use. In this display device, a switching element is provided in each pixel electrode to perform reliable switching therein, which makes it possible to achieve a display device having a large size and high accuracy.

In recent years, in the display device, a reduction in power consumption has been demanded, and an increase in the area of a pixel region has been also required to improve the brightness of display. Therefore, in order to fulfill the requirements, generally, a thick insulating film is formed on the entire surface of an active matrix substrate, and reflective pixel electrodes are formed on the insulating film. The structure in which the pixel electrodes are formed on the insulating film makes it possible to prevent a short circuit between scanning lines or signal lines arranged below the insulating film and the pixel electrodes formed on the insulating film, and thus to form the pixel electrodes on these wiring lines with a large area so as to overlap them. In this way, it is possible to allow almost the entire region including a region where switching elements, such as thin film transistors (hereinafter, referred to as TFTs), the scanning lines, and the signal lines are formed to serve as pixel regions contributing to display, and thus to raise an aperture ratio, which results in bright display.

However, the liquid crystal display device using only the reflective pixel electrodes cannot be used in a dark place. Therefore, there has come into widespread use a transflective liquid crystal display device having a backlight additionally provided therein, which enables a reflective liquid crystal display device to partially perform transmissive display (see JP-A-2000-171794 and Japanese Patent No. 3235102).

FIG. 13 shows an example of a transflective liquid crystal display device according to the related art (see JP-A-2000-171794). In the liquid crystal display device shown in FIG. 13, a plurality of TFTs 111 is formed in a display region on a transparent substrate 110, and an insulating film 112 is formed on the TFTs 111. In addition, reflective pixel electrodes 113 composed of an aluminum electrode film is formed on the insulating film 112 at pixel forming positions, and an uneven portion of each pixel electrode 113 serves as a reflective portion. Further, concave portions 116 are formed in the insulating film 112 positioned below these pixel electrodes 113, and a transparent gate insulating film 118 and a transparent drain electrode 119 are sequentially formed on the bottom of each concave portion 116. In this structure, a portion of the concave portion 116 where the drain electrode 119 is formed serves as a transmissive portion a. In addition, an alignment film 122 is formed so as to cover the insulating film 112, the pixel electrodes 113, and the concave portions 116.

Furthermore, a substrate 120 is provided opposite to the substrate 110 with a liquid crystal layer 109 interposed therebetween. A transparent counter electrode (a common electrode) 121 and an alignment film 123 are sequentially formed on a surface of the substrate 120 facing the liquid crystal layer 109.

However, a backlight provided on the rear surface of the substrate 110 is not shown in FIG. 13.

In the transflective liquid crystal display device shown in FIG. 13, an electric field is applied from the reflective pixel electrodes 113 and the source electrodes 119 to the liquid crystal layer 109 provided between the substrates to control the alignment of liquid crystal, thereby performing display. More specifically, a voltage is applied to the reflective pixel electrode 113 through the TFT 111 to control the alignment of the liquid crystal, so that the transmittance of the liquid crystal is controlled. The uneven portion of the pixel electrode 113 serves as a reflective display region which reflects light incident from the substrate 120 to perform reflective display. Also, a voltage is applied to the transparent source electrode 119 in addition to the pixel electrode 113 through the TFT 111, and a part of the concave portion 116 where the source electrode 119 is formed serves as a transmissive display region that transmits light emitted from the backlight to perform transmissive display. That is, a transflective liquid crystal display device capable of performing both the reflective display mode by the reflective pixel electrodes 113 and the transmissive display mode using the backlight and the transparent electrodes 119 is achieved by the structure shown in FIG. 13.

Further, in the transflective liquid crystal display device, light incident on the liquid crystal display device passes through the liquid crystal layer two times to reach an observer in the reflective display mode. On the other hand, the light passes through the liquid crystal layer only one time in the transmissive display mode. Therefore, unnecessary colors may be mixed with a display color, or different display colors may appear according to the display mode. In order to solve the problems, in the structure shown in FIG. 13, the liquid crystal layer is formed with a small thickness $d_1$ in the reflective portion, but is formed with a large thickness $d_2$ in the transmissive portion a due to the depth of the concave portion 116 formed in the insulating film 112 (a dual gap structure in which a cell gap of the reflective display region differs from that of the transmissive display region). In addition, the thickness (optical path) of the liquid crystal layer when light passes through the liquid crystal layer two times in the transmissive display mode is set to be equal to the thickness (optical path) of the liquid crystal layer when light passes through the liquid crystal layer one time, which makes it possible to prevent the mixture of display colors or a variation in a display color due to a difference between optical paths of two display modes.

However, in the transflective liquid crystal display device shown in FIG. 13, as described above, the thickness $d_2$ of the liquid crystal layer in the transmissive portion a (the liquid crystal layer in the transmissive display region) is two times the thickness $d_1$ of the liquid crystal layer in the reflective portion. Therefore, a difference between the thicknesses of the liquid crystal layer in both the display modes becomes large, which causes a large difference between threshold values or saturated voltages of the liquid crystal layer in the transmissive display region and the reflective display region when a driving voltage is applied, resulting in a large difference in contrast between the transmissive display mode and the reflective display mode in the same pixel.

SUMMARY OF THE INVENTION

An advantage of some aspects of the invention is that it provides a transflective liquid crystal display device having a dual gap (multi-gap) structure in which the thicknesses of a liquid crystal layer in a reflective portion and a transmissive portion are different from each other, capable of obtaining uniform contrast in both the transmissive portion and the reflective portion by adjusting optical characteristics of the transmissive portion and the reflective portion and thus of obtaining high display quality from both transmissive display and reflective display.

According to an aspect of the invention, a liquid crystal display device includes a liquid crystal cell having a pair of transparent substrates which are arranged opposite to each other, a liquid crystal layer which is provided between the pair of transparent substrates, a common electrode and an alignment film that are sequentially provided on an inner surface of one of the transparent substrates, a plurality of switching elements which are provided on an inner surface of the other substrate of the transparent substrates, a plurality of pixel electrodes which are connected to the respective switching elements, and an alignment film that is provided on the switching elements and the pixel electrodes; first and second retardation plates and a first polarizing plate that are sequentially formed on an outer surface of the one transparent substrate; and third and fourth retardation plates and a second polarizing plate that are sequentially formed on an outer surface of the other transparent substrate. In addition, a plurality of pixel regions corresponding to the pixel electrodes are formed in the liquid crystal cell. A portion of each pixel region having a reflective pixel electrode serves as a reflective portion, and the reflective portion has a reflector that reflects light incident from the other transparent substrate. The other portion of each pixel region serves as a transmissive portion that transmits light from the other transparent substrate to the one transparent substrate. Further, optical characteristics of the liquid crystal cell, the first to fourth retardation plates, and the first and second polarizing plates are set so as to the following four combinations of conditions.

According to a first combination, the following conditions are satisfied: the direction of an absorption axis c of the first polarizing plate: $(\psi-75°)-30°$ to $(\psi-75°)+30°$; a retardation value $\Delta nd_{RF2}$ of the second retardation plate: 250 nm to 290 nm; the direction of a slow axis d of the second retardation plate: $(\psi-60°)-15°$ to $(\psi-60°)+15°$; a retardation value $\Delta nd_{RF1}$ of the first retardation plate: 80 nm to 120 nm; the direction of a slow axis e of the first retardation plate: $(\psi-15°)$ to $(\psi+15°)$; a twist angle $\phi$ of the liquid crystal layer: 0° to 40°; a retardation value $\Delta nd_{LT}$ of the transmissive portion of the liquid crystal cell which is set to satisfy the following expression 1:

$$|\Delta nd_{LT}-550\sqrt{(\frac{1}{2})^2+(\phi/180)^2}|\leq 100 (nm);\quad\text{[Expression 1]}$$

a retardation value $\Delta nd_{LR}$ of the reflective portion of the liquid crystal cell which is set to satisfy the following expression 2:

$$|\Delta nd_{LR}-550\sqrt{(\frac{1}{4})^2+(\phi/180)^2}|\leq 40 (nm);\quad\text{[Expression 2]}$$

a retardation value $\Delta nd_{RF3}$ of the third retardation plate: 80 nm to 120 nm; the direction of a slow axis f of the third retardation plate: $(\psi-15°)$ to $(\psi+15°)$; a retardation value $\Delta nd_{RF4}$ of the fourth retardation plate: 250 nm to 290 nm; the direction of a slow axis g of the fourth retardation plate: $(\psi+60°)-15°$ to $(\psi+60°)+15°$; and the direction of an absorption axis h of the second polarizing plate: $(\psi-15°)-30°$ to $(\psi-15°)+30°$.

According to a second combination, the following conditions are satisfied: the direction of an absorption axis c of the first polarizing plate: $(\psi+15°)-30°$ to $(\psi+15°)+30°$; a retardation value $\Delta nd_{RF2}$ of the second retardation plate: 250 nm to 290 nm; the direction of a slow axis d of the second retardation plate: $(\psi-60°)-15°$ to $(\psi-60°)+15°$; a retardation value $\Delta nd_{RF1}$ of the first retardation plate: 80 nm to 120 nm; the direction of a slow axis e of the first retardation plate: $(\psi-15°)$ to $(\psi+15°)$; a twist angle $\phi$ of the liquid crystal layer: 0° to 40°; a retardation value $\Delta nd_{LT}$ of the transmissive portion of the liquid crystal cell which is set to satisfy the following expression 3:

$$|\Delta nd_{LT}-550\sqrt{(\frac{1}{2})^2+(\phi/180)^2}|\leq 100 (nm);\quad\text{[Expression 3]}$$

a retardation value $\Delta nd_{LR}$ of the reflective portion of the liquid crystal cell which is set to satisfy the following expression 4:

$$|\Delta nd_{LR}-550\sqrt{(\frac{1}{4})^2+(\phi/180)^2}|\leq 40 (nm);\quad\text{[Expression 4]}$$

a retardation value $\Delta nd_{RF3}$ of the third retardation plate: 80 nm to 120 nm; the direction of a slow axis f of the third retardation plate: $(\psi-15°)$ to $(\psi+15°)$; a retardation value $\Delta nd_{RF4}$ of the fourth retardation plate: 250 nm to 290 nm; the direction of a slow axis g of the fourth retardation plate: $(\psi+60°)-15°$ to $(\psi+60°)+15°$; and the direction of an absorption axis h of the second polarizing plate: $(\psi+75°)-30°$ to $(\psi+75°)+30°$.

According to a third combination, the following conditions are satisfied: the direction of an absorption axis c of the first polarizing plate: $(\psi+75°)-30°$ to $(\psi+75°)+30°$; a retardation value $\Delta nd_{RF2}$ of the second retardation plate: 250 nm to 290 nm; the direction of a slow axis d of the second retardation plate: $(\psi+60°)-15°$ to $(\psi+60°)+15°$; a retardation value $\Delta nd_{RF1}$ of the first retardation plate: 80 nm to 120 nm; the direction of a slow axis e of the first retardation plate: $(\psi-15°)$ to $(\psi+15°)$; a twist angle $\phi$ of the liquid crystal layer: 0° to 40°; a retardation value $\Delta nd_{LT}$ of the transmissive portion of the liquid crystal cell which is set to satisfy the following expression 5:

$$|\Delta nd_{LT}-550\sqrt{(\frac{1}{2})^2+(\phi/180)^2}|\leq 100 (nm);\quad\text{[Expression 5]}$$

a retardation value $\Delta nd_{LR}$ of the reflective portion of the liquid crystal cell which is set to satisfy the following expression 6:

$$|\Delta nd_{LR}-550\sqrt{(\frac{1}{4})^2+(\phi/180)^2}|\leq 40 (nm);\quad\text{[Expression 6]}$$

a retardation value $\Delta nd_{RF3}$ of the third retardation plate: 80 nm to 120 nm; the direction of a slow axis f of the third retardation plate: $(\psi-15°)$ to $(\psi+15°)$;

a retardation value $\Delta nd_{RF4}$ of the fourth retardation plate: 250 nm to 290 nm; the direction of a slow axis g of the fourth retardation plate: $(\psi-60°)-15°$ to $(\psi-60°)+15°$; and the direction of an absorption axis h of the second polarizing plate: $(\psi+15°)-30°$ to $(\psi+15°)+30°$.

According to a fourth combination, the following conditions are satisfied: the direction of an absorption axis c of the first polarizing plate: $(\psi-15°)-30°$ to $(\psi-15°)+30°$; a retardation value $\Delta nd_{RF2}$ of the second retardation plate: 250 nm to 290 nm; the direction of a slow axis d of the second retardation plate: $(\psi+60°)-15°$ to $(\psi+60°)+15°$; a retardation value $\Delta nd_{RF1}$ of the first retardation plate: 80 nm to 120 nm; the direction of a slow axis e of the first retardation plate: $(\psi-15°)$ to $(\psi+15°)$; a twist angle $\phi$ of the liquid crystal layer: 0° to 40°; a retardation value $\Delta nd_{LT}$ of the transmissive portion of the liquid crystal cell which is set to satisfy the following expression 7:

$$|\Delta nd_{LT} - 550\sqrt{(1/2)^2 + (\phi/180)^2}| \leq 100 \text{(nm)}; \quad \text{[Expression 7]}$$

a retardation value $\Delta nd_{LR}$ of the reflective portion of the liquid crystal cell which is set to satisfy the following expression 8:

$$|\Delta nd_{LR} - 550\sqrt{(1/4)^2 + (\phi/180)^2}| \leq 40 \text{(nm)}; \quad \text{[Expression 8]}$$

a retardation value $\Delta nd_{RF3}$ of the third retardation plate: 80 nm to 120 nm; the direction of a slow axis f of the third retardation plate: ($\psi-15°$) to ($\psi+15°$); a retardation value $\Delta nd_{RF4}$ of the fourth retardation plate: 250 nm to 290 nm; the direction of a slow axis g of the fourth retardation plate: ($\psi-60°$)$-15°$ to ($\psi-60°$)$+15°$; and the direction of an absorption axis h of the second polarizing plate: ($\psi-75°$)$-30°$ to ($\psi-75°$)$+30°$.

In the first to fourth combinations of conditions, when the alignment direction of the alignment film formed on the one transparent substrate is a direction a, the alignment direction of the alignment film formed on the other transparent substrate is a direction b, and the a direction that divides a narrow angle formed between the directions a and b into two equal angles is a center direction $\psi$, $\psi \pm N°$ (N is an integer) indicates the directions of each axis indicates, that is, positive and negative angles N with respect to the center direction $\psi$. That is, $\psi-N°$ indicates an angle rotating on an intersecting point O from the center direction $\psi$ by an angle of N° in the clockwise direction, as viewed from the one transparent substrate, and $\psi+N°$ indicates an angle rotating on the intersecting point O from the center direction $\psi$ by an angle of N° in the counter clockwise direction, as viewed from the one transparent substrate.

In the above-mentioned structure, it is more preferable that the twist angle $\phi$ of the liquid crystal layer be set in a range of 0° to 30°.

According to the above-mentioned structure, in the liquid crystal display device operating in an ECB mode, it is possible to obtain uniform display in both the transmissive portion and the reflective portion and to prevent display irregularity. In particular, it is possible to prevent irregularity of contrast. In addition, since the retardation values $\Delta nd_{LT}$ and $\Delta nd_{LR}$ of the liquid crystal cell relate to the function of the twist angle $\phi$ of the liquid crystal layer, the control of the twist angle makes it possible to easily optimize optical characteristics.

Further, in the above-mentioned structure, it is preferable that the pixel electrode in the reflective portion be the reflective pixel electrode composed of a metal film, and that the pixel electrode in the transmissive portion be a transmissive pixel electrode composed of a transparent conductive film.

Furthermore, in the above-mentioned structure, preferably, color filters are provided between the one transparent substrate and the common electrode, and the thickness of the color filter in the reflective portion is smaller than that of the color filter in the transmissive portion. In addition, it is preferable that the thickness of the color filter in the reflective portion be half the thickness of the color filter in the transmissive portion.

Light incident on the surface of the liquid crystal cell passes through the color filter in the reflective portion and is then reflected from the reflector. Then, the reflected light passes through the color filter again. That is, light passes through the color filter in the reflective portion two times.

On the other hand, light passes through the color filter in the transmissive portion only one time. Therefore, when the thicknesses of the color filters are equal to each other in the reflective portion and the transmissive portion, brightness is lowered in the reflective portion, which causes color irregularity between the transmissive portion and the reflective portion.

Therefore, the above-mentioned structure makes it possible to prevent color irregularity between the transmissive portion and the reflective portion and thus to achieve uniform contrast and brightness.

Further, the thickness of the color filter in the reflective portion is half the thickness of the color filter in the transmissive portion, which makes it possible to completely prevent color irregularity.

Furthermore, in the above-mentioned structure, preferably, a transparent resin layer is formed on a surface of each color filter facing the liquid crystal layer in the reflective portion, so that the total thickness of the color filter and the transparent resin layer in the reflective portion is equal to the thickness of the color filter in the transmissive portion.

The above-mentioned structure causes the transparent resin layer in the reflective portion and the color filter in the transmissive portion to be formed on the same surface, which makes it possible to easily control a cell gap of the liquid crystal cell.

Moreover, in the above-mentioned structure, it is preferable that the thickness of the liquid crystal layer in the transmissive portion be about two times the thickness of the liquid crystal layer in the reflective portion.

Further, in the above-mentioned structure, preferably, the total thickness of the reflector and the liquid crystal layer in the reflective portion is equal to the thickness of the liquid crystal layer in the transmissive portion, and the thickness of the reflector is equal to the thickness of the liquid crystal layer in the reflective portion.

According to this structure, it is possible to make the length of an optical path of light passing through the liquid crystal layer in the reflective portion substantially equal to the length of an optical path of light passing through the liquid crystal layer in the transmissive portion, and thus to achieve a liquid crystal display device having both the reflective portion and the transmissive portion.

Furthermore, in the above-mentioned structure, it is preferable that a step portion of the reflector be arranged adjacent to the transmissive pixel electrode, and that an inclination angle of the step portion be set in a range of 25° to 55°.

According to this structure, light can be reflected from the step portion, and a boundary between the transmissive portion and the reflective portion can be reliably defined, which makes it possible to prevent display irregularity.

DESCRIPTION OF THE PREFERRED EMBODIMENTS

Figure 1:
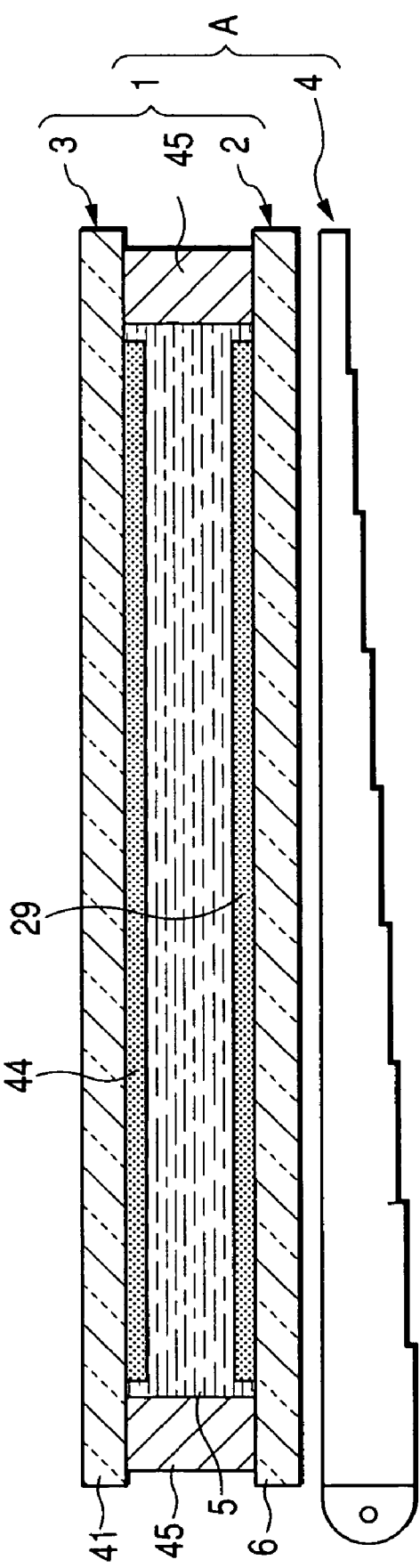
FIG. 1 is a cross-sectional view schematically illustrating a liquid crystal display device according to an embodiment of the invention.

Hereinafter, a liquid crystal display device according to a first embodiment of the invention will be described with reference to the accompanying drawings. Each component has a different dimension and thickness so as to be recognizable in the drawings.

FIGS. 1 to 12 show a transflective liquid crystal display device (a liquid crystal display device) according to an embodiment of the invention. A transflective liquid crystal display device A of this embodiment is operated in an ECB mode. As shown in FIG. 1, the transflective liquid crystal display device A includes a liquid crystal panel (a liquid crystal cell) 1, serving as the main body, and a backlight 4 provided on the rear surface of the liquid crystal panel 1.

Figure 2:
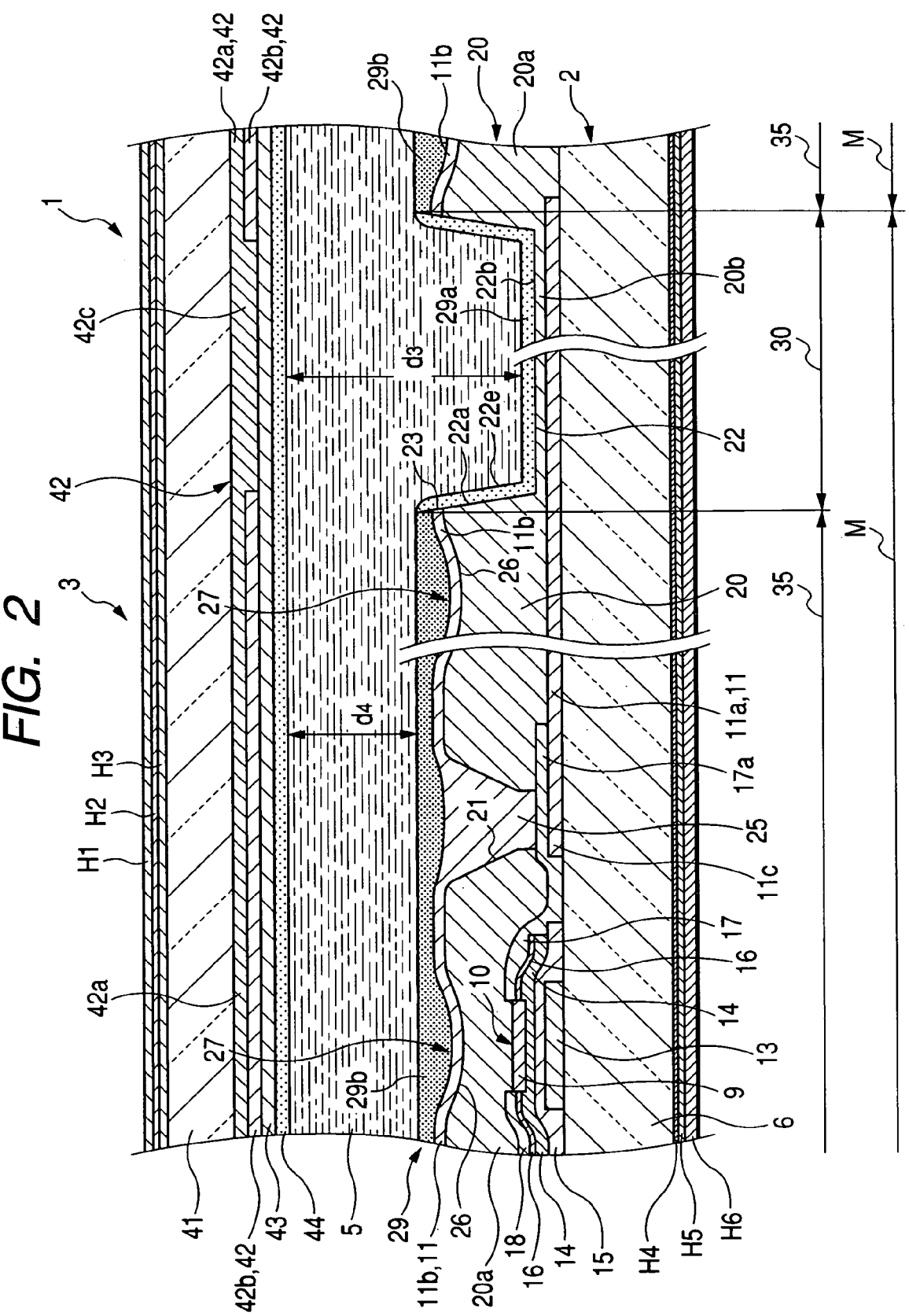
FIG. 2 is a cross-sectional view schematically illustrating a liquid crystal cell included in the liquid crystal display device according to the embodiment of the invention.

As shown in FIGS. 1 and 2, the liquid crystal panel 1 includes an active matrix substrate 2 having switching elements 10 formed thereon, a counter substrate 3 provided opposite to the active matrix substrate 2, and a liquid crystal layer 5 provided between the substrates 2 and 3 as a light modulating layer.

In the counter substrate 3, color filters 42, a common electrode 43, and an alignment film 44 are sequentially arranged on an inner surface (a surface facing the liquid crystal layer 5) of a substrate 41 (one transparent substrate). In addition, the active matrix substrate 2 includes a substrate 6 (another transparent substrate), the switching elements 10 formed on the substrate 6, pixel electrodes 11 connected to the switching elements, a reflector 20, and an alignment film 29 formed on the pixel electrodes 11. The liquid crystal layer 5 is arranged between the alignment films 29 and 44.

Further, the pixel electrode 11 includes a transmissive pixel electrode 11a formed on the substrate 6 and a reflective pixel electrode 11b constituting the reflector 20 together with an insulating film 20a. The transmissive pixel electrode 11a and the reflective pixel electrode 11b are connected to the switching element 10.

Meanwhile, a first retardation plate (a retardation plate adjacent to the counter substrate 3) H3, a second retardation plate (a retardation plate adjacent to a first polarizing plate) H2, and a first polarizing plate H1 are formed on the outer surface of the counter substrate 3 in this order. In addition, a third retardation plate H4, a fourth retardation plate H5, and a second polarizing plate H6 are formed on the outer surface of the active matrix substrate 2 in this order. The backlight 4 is arranged below the second polarizing plate H6.

The transflective liquid crystal display device A having the above-mentioned structure is operated in a reflective mode in which the backlight 4 is not turned on when external light is sufficient, and is operated in a transmissive mode using the backlight 4 when sufficient external light is not obtained.

In the reflective mode, light incident on the first polarizing plate H1 is linearly polarized by the first polarizing plate H1, and the linearly polarized light passes through the second and first retardation plates H2 and H3 and the liquid crystal layer 5 to be circularly polarized. The circularly polarized light is reflected from the reflector 20 and then sequentially passes through the first and second retardation plates H3 and H2 and the first polarizing plate H1 to be linearly polarized again. Then, the linearly polarized light is emitted to the outside.

In the transmissive mode, light emitted from the backlight 4 is linearly polarized by the second polarizing plate H6, and the linearly polarized light passes through the fourth and third retardation plates H5 and H4, the liquid crystal layer 5, and the first and second retardation plates H3 and H2 in this order to be circularly polarized. Subsequently, the circularly polarized light passes through the first polarizing plate H1 to be linearly polarized, and is then emitted from the first polarizing plate H1.

Figure 3:
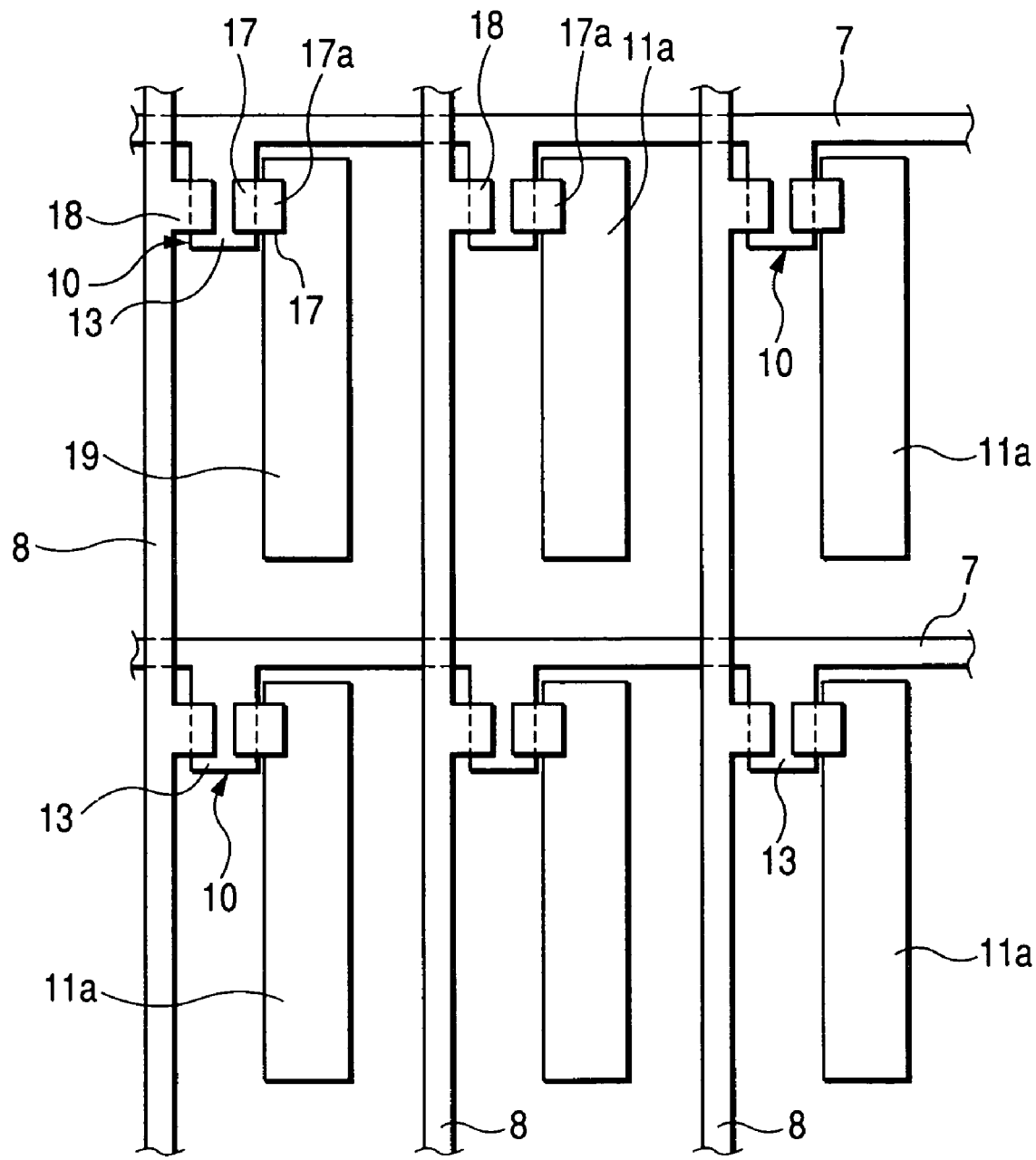
FIG. 3 is a plan view schematically illustrating an example of the arrangement of pixel electrodes of the liquid crystal cell.
Figure 4:
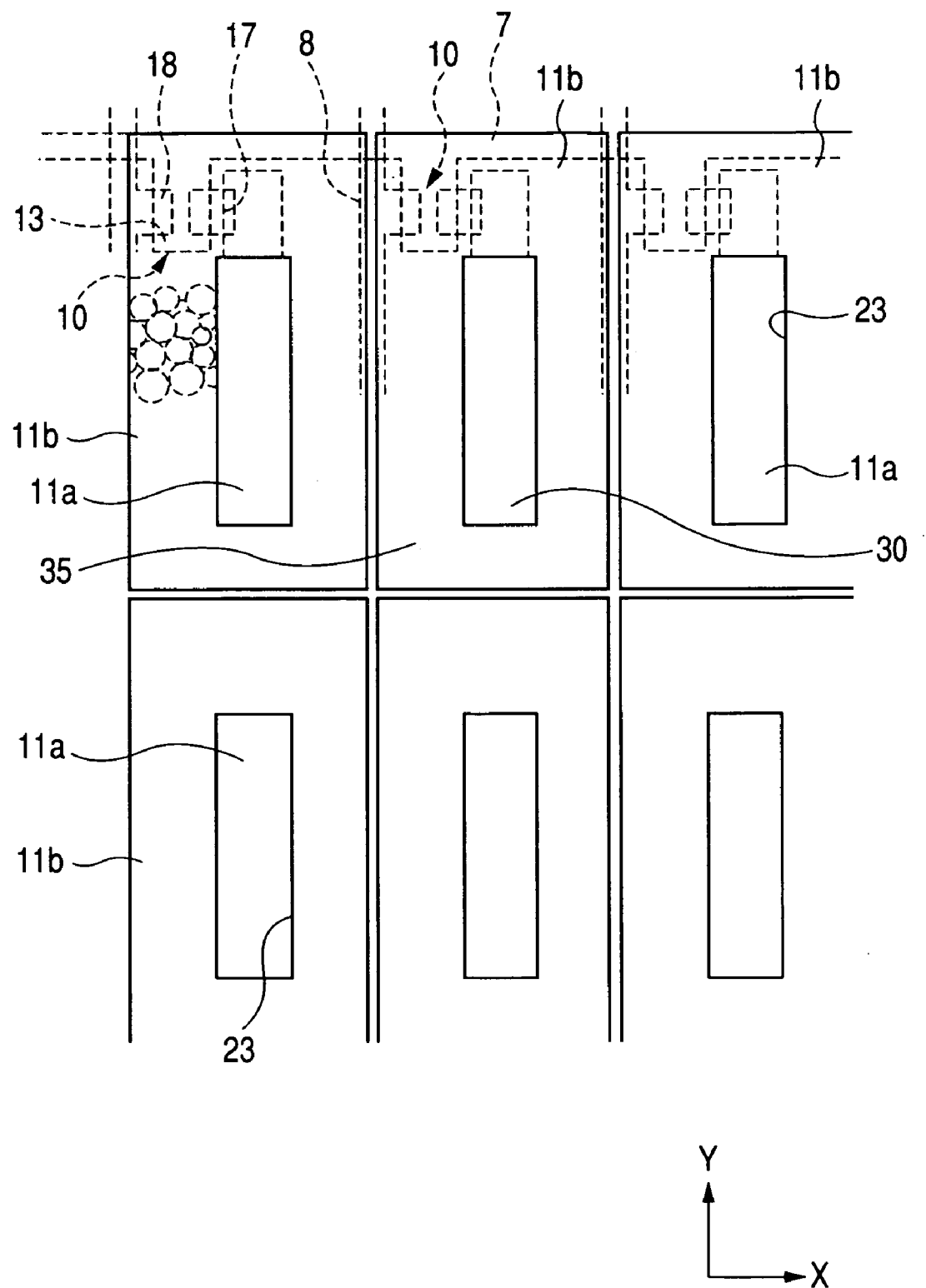
FIG. 4 is a plan view schematically illustrating an example of the arrangement of the pixel electrodes of the liquid crystal cell.

As shown in FIGS. 2, 3, and 4, in the active matrix substrate 2, a plurality of scanning lines 7 and a plurality of signal lines 8 are formed on the substrate 6 in the row direction (the x direction of FIGS. 3 and 4) and the column direction (the y direction of FIGS. 3 and 4) so as to be electrically insulated from each other, and TFTs (switching elements) 10 are formed in the vicinities of intersections of the scanning lines 7 and the signal lines 8. In this embodiment, a region of the substrate where the pixel electrodes 11 (11a and 11b) are formed is referred to as a pixel region M, and another region thereof where the TFTs 10 are formed is referred to as an element region. In addition, still another region thereof where the scanning lines and the signal lines are formed is referred to as a wiring region.

The TFT 10 has an inverted-staggered structure, and a gate electrode 13, a gate insulating film 15, an i-type semiconductor layer 14, a source electrode 17, and a drain electrode 18 are formed on the lowermost layer of the substrate 6 in this order. In addition, an etching stopper layer 9 is formed between the source electrode 17 and the drain electrode 18 on the i-type semiconductor layer 14.

That is, the gate electrode 13 is formed of an extending portion of the scanning line 7, and an island-shaped semiconductor layer 14 is formed on the gate insulating film 15 covering the gate electrode 13 so as to be laid across the gate electrode 13 in plan view. Then, the source electrode 17 is formed at one end of the i-type semiconductor layer 14 with an n-type semiconductor layer 16 interposed therebetween, and the drain electrode 18 is formed at the other end of the i-type semiconductor layer 14 with the n-type semiconductor layer 16 interposed therebetween.

Further, each transmissive pixel electrode 11a (the pixel electrode 11) formed of a transparent electrode material, such as ITO is formed on the substrate 6 so as to be arranged in the center of a rectangular region surrounded by the scanning lines 7 and the signal lines 8. Therefore, the transmissive pixel electrodes 11a are formed on the same surface as the gate electrodes 13. The transmissive pixel electrode 11a is directly connected to a connecting portion 17a of the source electrode 17 that is formed on an end 11c of the transmissive pixel electrode 11a so as to be connected thereto, and is formed in a strip shape in plan view. As shown in FIG. 3, the transmissive pixel electrode 11a has a width considerably smaller than the width of the rectangular region surrounded by the scanning lines 7 and the signal lines 8. That is, the transmissive pixel electrode 11a is formed to have a width corresponding to a fraction of the width of the rectangular region.

The substrate 6 is composed of an insulating transparent substrate formed of, for example, synthetic resin other than glass. The gate electrode 13 is formed of a conductive metallic material, and is integrally formed with the scanning line 7 arranged in the row direction, as shown in FIG. 3. The gate insulating film 15 is composed of an insulating film formed of a silicon-based material, such as a silicon oxide ($SiO_x$) or a silicon nitride ($SiN_y$), and is formed on the substrate so as to cover the scanning lines 7 and the gate electrodes 13 but so as not to cover the transmissive pixel electrodes 11a. The gate insulating film 15 should be formed in at least a region other than a connecting portion between the transmissive pixel electrode 11a and the source electrode 17. Therefore, in this embodiment, the gate insulating film 15 is not formed on the transmissive pixel electrode 11a. The gate insulating film 15 may be formed on the transmissive pixel electrode 11a in portions other than a portion of the transmissive pixel electrode 11a connected to the source electrode 17.

The semiconductor layer 14 is formed of, for example, amorphous silicon (a-Si), and a region of the semiconductor layer 15 opposite to the gate electrode 13 with the gate insulating film 15 interposed therebetween serves as a channel region. The source electrode 17 and the drain electrode 18 are formed of a conductive material, and are formed on the semiconductor layer 14 with the channel region interposed therebetween. In addition, each drain electrode 18 extends from the signal line 8 provided in the column direction.

Further, in order to provide good ohmic contact between the i-type semiconductor layer 14 and the source and drain electrodes 17 and 18, an n-type semiconductor layer (an ohmic contact layer) 16 which is highly doped with V-group elements, such as phosphorous (P), is provided between the semiconductor layer 14 and the electrodes 17 and 18.

Furthermore, an insulating film 20a made of an organic material is formed on the substrate 6, and the reflective pixel electrodes 11b (the pixel electrodes 11) made of a metallic material having high reflectance, such as Al or Ag, are formed on the insulating film 20a. The insulating film 20a and the reflective pixel electrodes 11b constitute the reflector 20.

The reflective pixel electrode 11b is formed on the insulating film 20a so as to have a rectangular shape in plan view considerably smaller than the rectangular region surrounded by the scanning lines 7 and the signal lines 8. In the plan view shown in FIG. 4, the reflective pixel electrodes 11b are arranged in a matrix at predetermined intervals in the horizontal and vertical directions so as not to be electrically connected to each other. That is, the reflective pixel electrodes 11b are provided such that the edges thereof are arranged along the scanning lines 7 and the signal lines 8 placed on the lower sides thereof, and almost the entire region partitioned by the scanning lines 7 and the signal line 8 serves as a pixel region. In addition, all the pixel regions correspond to a display region of the liquid crystal panel 1.

The insulating film 20a is composed of an organic insulating film formed of, for example, acryl-based resin, polyimide-based resin, or benzocyclobutene (BCB), and functions to strengthen the protection of the TFTs 10. The insulating film 20a is formed on the substrate 6 with a relatively large thickness to insulate the TFTs 10 and various wiring lines from the transmissive pixel electrodes 11a. In addition, the insulating film 20a prevents parasitic capacitance from occurring between the transmissive pixel electrodes 11 and the TFTs 10 or the wiring lines and planarizes step portions on the substrate 5 formed by the TFTs 10 or various wiring lines.

Next, contact holes 21 are provided in the insulating film 20a so as to reach end portions 17a of the source electrodes 17, and concave portions 22 are provided in the insulating film 20a so as to be positioned above the transmissive pixel electrodes 11a. A through hole 23 is formed in a portion of the reflective pixel electrode 11b corresponding to a forming position of the concave portion so as to coincide with an aperture 22a of the concave portion 22 in plan view. Each concave portion 22 is formed by removing the insulating film 20a in the thickness direction thereof such that a portion of the insulating film 20a remains on the side of a bottom 22b as a covering layer 20b, and the concave portion 22 is formed in a strip shape whose width is considerably smaller than the width of the transmissive pixel electrode 11a such that the plan-view shape of the concave portion corresponds to that of the transmissive pixel electrode 11a.

In each pixel region, the forming region of the concave portion 22 serves as a transmissive portion 30 for transmitting light incident on the active matrix substrate 2 (light emitted from the backlight 4), and a non-through hole portion (a portion where the through hole 23 is not formed) serves as a reflective portion 35 for reflecting light incident on the counter substrate 3.

Further, one of the pixel electrodes 11 (11a and 11b) corresponds to almost one pixel region, and the area of the through hole 23 corresponds to a light transmission region in transmissive display. Therefore, the area of the through hole 23 is preferably 20 to 60%, more preferably, 40% of the total area of the pixel electrode 11. Further, in this embodiment, one through hole 23 is formed in one pixel electrode 11.

However, a plurality of through holes may be formed in one pixel electrode 11. In this case, the total area of the plurality of through holes is 20 to 60% of the total area of the pixel electrode 11. Of course, in this case, concave portions are provided below the through holes, corresponding to the forming positions of the through holes.

A connecting portion 25 made of a conductive material is formed in the contact hole 21 provided in the insulating film 20a, and the reflective pixel electrode 11b is electrically connected to the source electrode 17 arranged below the insulating film 20a through the connecting portion 25. Therefore, the source electrode 17 is electrically connected to the transmissive pixel electrode 11a and the reflective pixel electrode 11b.

Further, a lower-substrate-side alignment film 29 (alignment film) formed of, for example, polyimide is provided on the substrate 6 having the above-mentioned structure so as to cover the reflector 20 and the concave portions 22. In this case, for example, a rubbing process is performed on the alignment film in advance.

Furthermore, a step portion 22c, which is a side wall of the concave portion 22 corresponding to the thickness of the insulating film 20a is formed in the concave portion 22 provided in the insulating film 20a. In this embodiment, the step portion 22c is inclined at an angle of 22° to 55°. This structure makes it possible to reflect light from the step portion 22c, to clearly define a boundary between the transmissive portion 30 and the reflective portion 35, and to prevent display irregularity. When the inclination angle of the step portion 22c is smaller than 25°, projection in the normal direction of the step portion 22c is lengthened, which results in a small effective display area. When the inclination angle of the step portion 22c is larger than 55°, alignment disorder due to unevenness becomes remarkable. Thus, it is preferable that the inclination angle of the step portion 22c be 40°.

In the counter substrate 3, the color filter layer 42 is formed on a surface of the transparent substrate 41 made of, for example, glass or plastic, facing the liquid crystal layer 5, as shown in FIG. 2.

Figure 5:
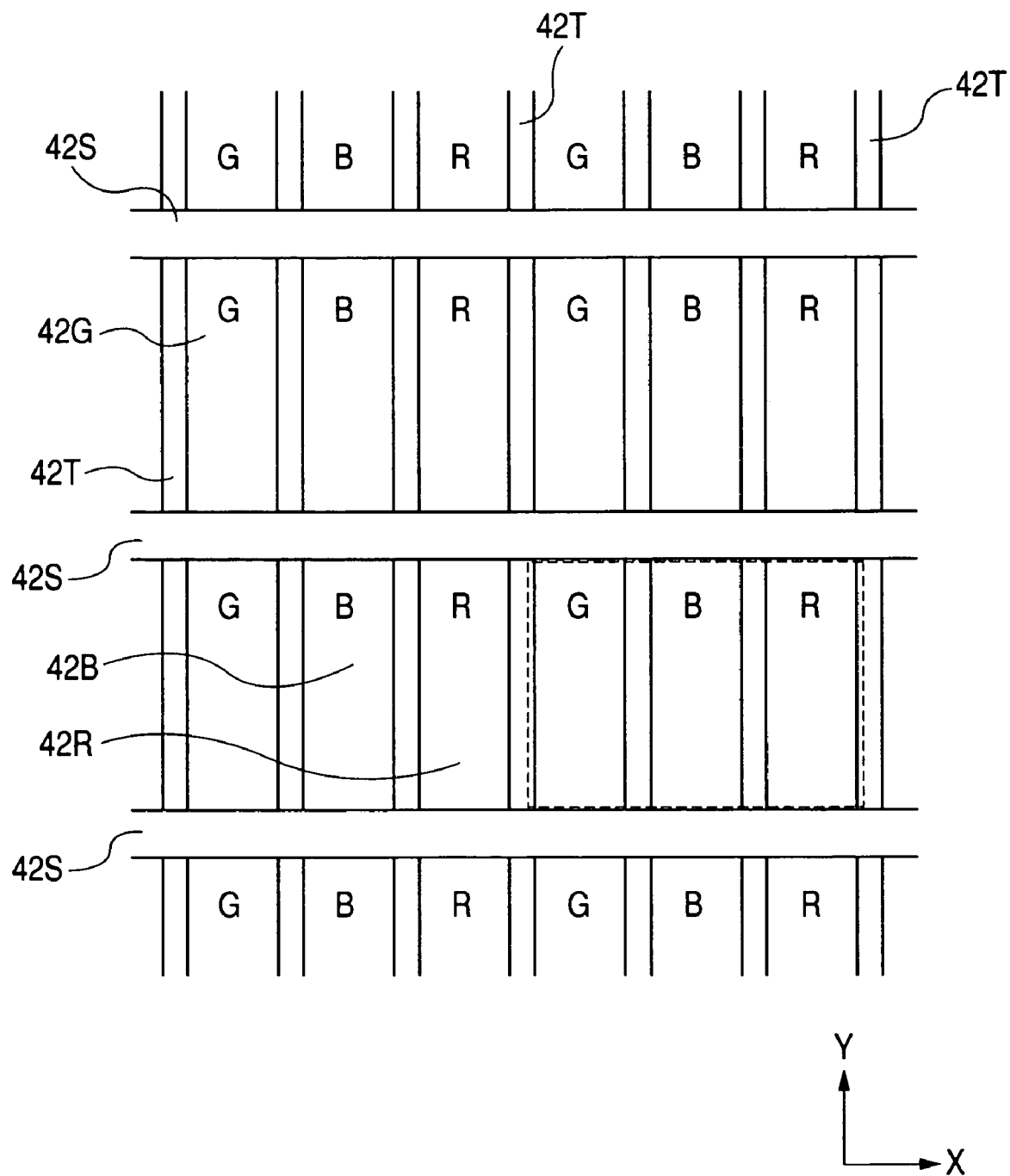
FIG. 5 is a diagram illustrating color filters included in the liquid crystal cell.

As shown in FIG. 5, color filters 42R, 42G, and 42B for reflectively transmitting red (R), green (G), and blue (B) light components are periodically arranged in the color filter layer 42, and the color filters 42R, 42G, and 42B are provided at positions opposite to the pixel electrodes 11 (11a and 11b). In addition, in the color filter layer 42, light shielding layers 42S and 42T are formed in a lattice shape in regions where the color filters 42R, 42G, and 42B are not formed.

Further, the color filter layer 42 includes a reflective color filter 42a arranged on the reflective film 35 and a transparent resin layer 42b formed on the reflective color filter 42a, and a transmissive color filter 42c that is integrally formed with the reflective color filter 42a on the transmissive portion 30. The thickness of the reflective color filter 42a is half the thickness of the transmissive color filter 42c. In addition, the total thickness of the reflective color filter 42a and the transparent resin layer 42c is substantially equal to the thickness of the transmissive color filter 42c. In this way, the surface of the color filter layer 42 facing the liquid crystal layer 5 is planarized.

Furthermore, a counter electrode (common electrode) made of a transparent material, such as ITO, and an upper-substrate-side alignment film 44 are sequentially formed on the surface of the color filter layer 42 facing the liquid crystal layer 5. The upper-substrate-side alignment film 44 is formed of, for example, polyimide, and a predetermined alignment process, such as a rubbing process, is performed on the upper-substrate-side alignment film 44.

Moreover, a gap between the substrates 2 and 3 having the above-mentioned structure is uniformly maintained by spacers (not shown). As shown in FIG. 1, the substrates 2 and 3 are bonded to each other by a thermosetting sealing member 45 applied in a rectangular frame shape at the periphery of the substrates. Then, liquid crystal is injected into a space sealed by the substrates 2 and 3 and the sealing member 45 to form the liquid crystal layer serving as a light modulating layer, thereby forming the liquid crystal cell 1.

In the transflective liquid crystal display device A according to this embodiment, as described above, the concave portions 22 are formed in the insulating film 20a, and liquid crystal is introduced into the concave portions 22. Therefore, a thickness $d_3$ of the liquid crystal layer 5 in the transmissive portion 30 is larger than a thickness $d_4$ of the liquid crystal layer 5 in the reflective portion 35. Preferably, the thickness $d_3$ of the liquid crystal layer 5 in the transmissive portion 30 is two times the thickness $d_4$ of the liquid crystal layer 5 in the reflective portion 35. That is, the total of the thickness of the reflector 20 and the thickness $d_4$ of the liquid crystal layer 5 in the reflective portion 35 is equal to the thickness $d_3$ of the liquid crystal layer 5 in the transmissive portion 30, and the thickness of the reflector 20 is equal to the thickness $d_4$ of the liquid crystal layer 5 in the reflective portion 35.

Next, the optical characteristics of the transflective liquid crystal display device A of this embodiment will be described.

First, the optical characteristics of the liquid crystal cell 1 will be described.

It is preferable that the liquid crystal layer 5 have a spiral structure in which it is twisted in the thickness direction in an angular range of 0° to 40°, preferably, in an angular range of 0° to 30° (liquid crystal molecules constituting the liquid crystal layer 5 have a twist angle φ of 0° to 40°, preferably, 0° to 30°.

The liquid crystal layer 5 is composed of liquid crystal molecules which are in a nematic state at room temperature.

The liquid crystal constituting the liquid crystal layer 5 has the wavelength dispersion characteristic of a birefringence ($\Delta n_{LC}$) smaller than the wavelength dispersion characteristic of a birefringence ($\Delta n_{RF1}$) of the first retardation plate H3, the wavelength dispersion characteristic of a birefringence ($\Delta n_{RF2}$) of the second retardation plate H2, the wavelength dispersion characteristic of a birefringence ($\Delta n_{RF3}$) of the third retardation plate H4, and the wavelength dispersion characteristic of a birefringence ($\Delta n_{RF4}$) of the fourth retardation plate H5, which is preferable in that high contrast and good display characteristics can be obtained. The wavelength dispersion characteristic of the birefringence ($\Delta n_{LC}$) of the liquid crystal constituting the liquid crystal layer 5 can be changed by varying a liquid crystal material. In addition, the wavelength dispersion characteristics of the birefringences ($\Delta n_{RF1}$, $\Delta n_{RF2}$, $\Delta n_{RF3}$, and $\Delta n_{RF4}$) of the first to fourth retardation plates H2 to H5 can be changed by varying materials forming the respective retardation plates.

Figure 6:
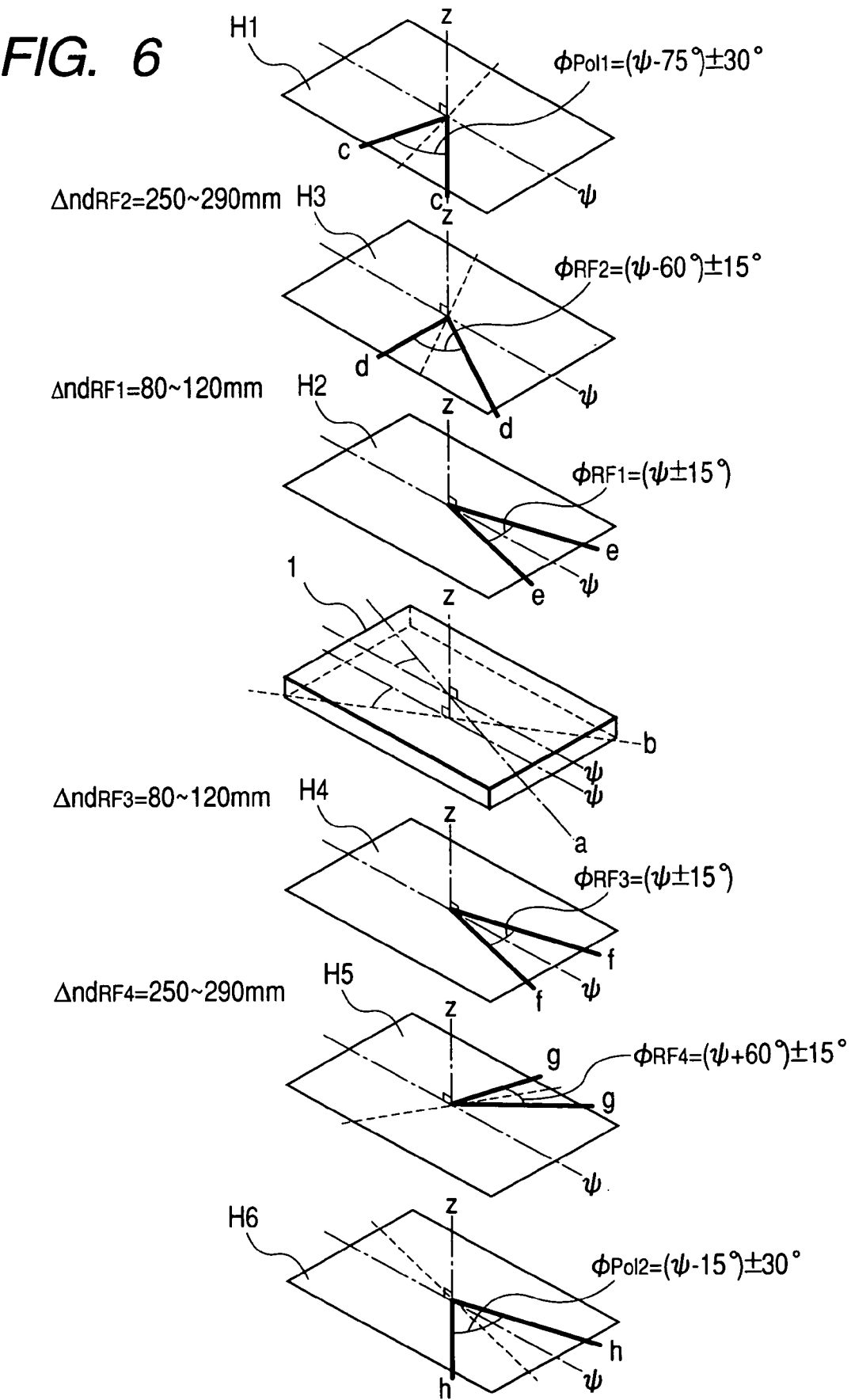
FIG. 6 is an exploded perspective view illustrating main portions of the liquid crystal display device according to the embodiment of the invention and optimum optical conditions thereof.
Figure 7:
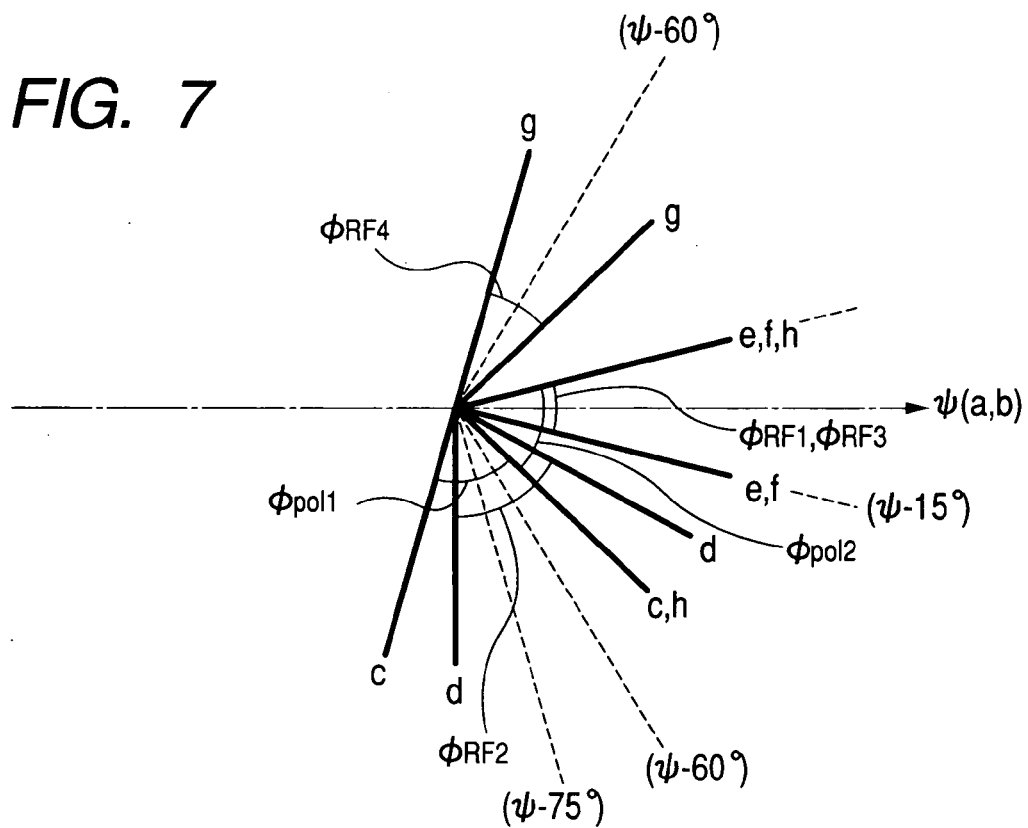
FIG. 7 is a diagram illustrating a first combination of an absorption axis c of a first polarizing plate, a slow axis d of a second retardation plate, a slow axis e of a first retardation plate, an alignment direction a of an upper alignment film, an alignment direction b of a lower alignment film, a slow axis f of a third retardation plate, a slow axis g of a fourth retardation plate, and an absorption axis h of a second polarizing plate in arrangement.

As shown in FIGS. 6 and 7, an angle formed between an alignment direction (rubbing direction) a of the upper-substrate-side alignment film 44 and an alignment direction (rubbing direction) b of the lower-substrate-side alignment film 29 are preferably within a range of 0° to 40°, more preferably, a range of 0° to 30° such that they can correspond to the twist angle φ of the liquid crystal layer 5. As shown in FIGS. 6 and 7, a direction where the angle formed between the alignment directions a and b is divided into two equal angles is referred to as a center direction ψ. Further, in FIGS. 6 and 7, a character Z indicates a direction perpendicular to the light incident surfaces of the liquid crystal cell 1, the first to fourth retardation plates H2 to H5, and the first and second polarizing plates H1 and H6.

As described above, the value of retardation ($\Delta nd_{LT}$), which is the product of a birefringence ($\Delta n_{LT}$) of the liquid crystal cell 1 in the transmissive portion 30 and a thickness d($d_3$) of the liquid crystal layer 5, is set in the range of the following expression 9 (a measured wavelength of 589 nm). Since the retardation $\Delta nd_{LT}$ is within the range, white display appears to be dark, which results in a reduction in contrast.

Further, the value of retardation ($\Delta nd_{LR}$), which is the product of a birefringence ($\Delta n_{LR}$) of the liquid crystal cell 1 in the reflective portion 35 and the thickness d($d_4$) of the liquid crystal layer 5, is set in the range of the following expression 10 (a measured wavelength of 589 nm). Since the retardation $\Delta nd_{LR}$ is within the range, white display appears to be dark, which results in a reduction in contrast.

$$|\Delta nd_{LT} - 550\sqrt{(1/2)^2 + (\phi/180)^2}| \leq 100 (nm) \quad \text{[Expression 9]}$$

$$|\Delta nd_{LR} - 550\sqrt{(1/4)^2 + (\phi/180)^2}| \leq 40 (nm) \quad \text{[Expression 10]}$$

Next, the optical characteristics of the retardation plates H2 to H5 and the polarizing plates H1 and H6 will be described.

In the transflective liquid crystal display device A of this embodiment, as described above, light passes through the third and fourth retardation plates H4 and H5 and the second polarizing plate H6 in only the transmissive mode. Therefore, the first and second retardation plates H3 and H2 and the first polarizing plate H1 participate in the operation of the liquid crystal display device in both the transmissive mode and the reflective mode, and the third and fourth retardation plates H4 and H5 and the second polarizing plate H6 participate in the operation thereof in only the transmissive mode. The retardation plates H2 to H5 and the polarizing plates H1 and H6 can be combined into four ways in optical characteristics. The four combinations will be described below.

In the following description, ψ+N° (N is an integer) indicates the direction of a slow axis of each retardation plate and also indicates an angle N formed with respect to the alignment direction ψ of the liquid crystal layer. ψ+N° indicates an angle rotating from the alignment direction ψ by an angle of N° in the counterclockwise direction, as viewed from one substrate. ψ−N° indicates an angle rotating from the alignment direction ψ by an angle of N° in the clockwise direction, as viewed from the one substrate.

Further, (ψ±N°)+n° indicates an angle rotating from the position of (ψ±N°) by an angle of n° in the counterclockwise direction. In addition, (ψ+N°)−n° indicates an angle rotating from the position of (ψ+N°) by an angle of n° in the clockwise direction.

First Combination

The first to fourth retardation plates H2 to H5 are composed of films formed of, for example, a uniaxially stretched norbornene-based resin material (ZEONOR (manufactured by ZEON CORPORATION in JAPAN), ARTON (manufactured by JSR), or polycarbonate, and the stretched direction is the slow axis.

A retardation value $\Delta nd_{RF1}$ of the first retardation plate H2 is set in a range of 80 nm to 120 nm (a measured wavelength of 589 nm). When the retardation value $\Delta nd_{RF1}$ is outside the above-mentioned range, high contrast and high brightness are not obtained in the transmissive mode and the reflective mode.

Further, as shown in FIGS. 6 and 7, a slow axis e of the first retardation plate H2 is set such that an angle $\phi_{RF1}$ formed with respect to the center direction ψ is in a range of (ψ−15°) to (ψ+15°), as viewed from a light incident side. When the slow axis e is not set in the above-mentioned range, high contrast and high brightness are not obtained in the transmissive mode and the reflective mode.

Furthermore, a retardation value $\Delta nd_{RF2}$ of the second retardation plate H3 is set in a range of 250 nm to 290 nm (a measured wavelength of 589 nm). When the retardation value $\Delta nd_{RF2}$ is outside the above-mentioned range, high contrast and high brightness are not obtained in the transmissive mode and the reflective mode.

As shown in FIGS. 6 and 7, a slow axis d of the second retardation plate H3 is set such that an angle $\phi_{RF2}$ formed with respect to the center direction ψ is in a range of (ψ−60°)−15° to (ψ−60°)+15°, as viewed from a light incident side. When the slow axis d is not set in the above-mentioned range, high contrast and high brightness are not obtained in the transmissive mode and the reflective mode.

Further, a retardation value $\Delta nd_{RF3}$ of the third retardation plate H4 is set in a range of 80 nm to 120 nm (a measured wavelength of 589 nm). When the retardation value $\Delta nd_{RF3}$ is outside the above-mentioned range, high contrast and high brightness are not obtained in the transmissive mode and the reflective mode.

As shown in FIGS. 6 and 7, a slow axis f of the third retardation plate H4 is set such that an angle $\phi_{RF3}$ formed with respect to the center direction ψ is in a range of (ψ−15°) to (ψ+15°), as viewed from a light incident side. When the slow axis f is not set in the above-mentioned range, high contrast and high brightness are not obtained in the transmissive mode.

Furthermore, a retardation value $\Delta nd_{RF4}$ of the fourth retardation plate H5 is set in a range of 250 nm to 290 nm (a measured wavelength of 589 nm). When the retardation value $\Delta nd_{RF4}$ is outside the above-mentioned range, high contrast and high brightness are not obtained in the transmissive mode and the reflective mode.

As shown in FIGS. 6 and 7, a slow axis g of the fourth retardation plate H5 is set such that an angle $\phi_{RF4}$ formed with respect to the center direction ψ is in a range of (ψ−60°)−15° to (ψ−60°)+15°, as viewed from a light incident side. When the slow axis g is not set in the above-mentioned range, high contrast and high brightness are not obtained in the transmissive mode.

Next, as shown in FIGS. 6 and 7, an absorption axis c of the first polarizing plate H1 is set such that an angle $\phi_{pol1}$ formed with respect to the center direction ψ is in a range of (ψ−75°)−30° to (ψ−75°)+30°, as viewed from a light incident side. When the absorption axis c of the first polarizing plate H1 is not set in the above-mentioned range, good white display with high contrast is not obtained in the transmissive mode and the reflective mode.

Further, as shown in FIGS. 6 and 7, an absorption axis h of the second polarizing plate H6 is set such that an angle $\phi_{pol2}$ formed with respect to the center direction ψ is in a range of (ψ−15°)−30° to (ψ−15°)+30°, as viewed from a light incident side. When the absorption axis h of the second polarizing plate H6 is not set in the above-mentioned range, good white display with high contrast is not obtained in the transmissive mode.

Second Combination

Similar to the first combination, the first to fourth retardation plates H2 to H5 are composed of films formed of, for example, a uniaxially stretched norbornene-based resin material or polycarbonate, and the stretched direction is the slow axis.

A retardation value $\Delta nd_{RF1}$ of the first retardation plate H2 is set in a range of 80 nm to 120 nm (a measured wavelength of 589 nm). When the retardation value $\Delta nd_{RF1}$ is outside the above-mentioned range, high contrast and high brightness are not obtained in the transmissive mode and the reflective mode.

Figure 8:
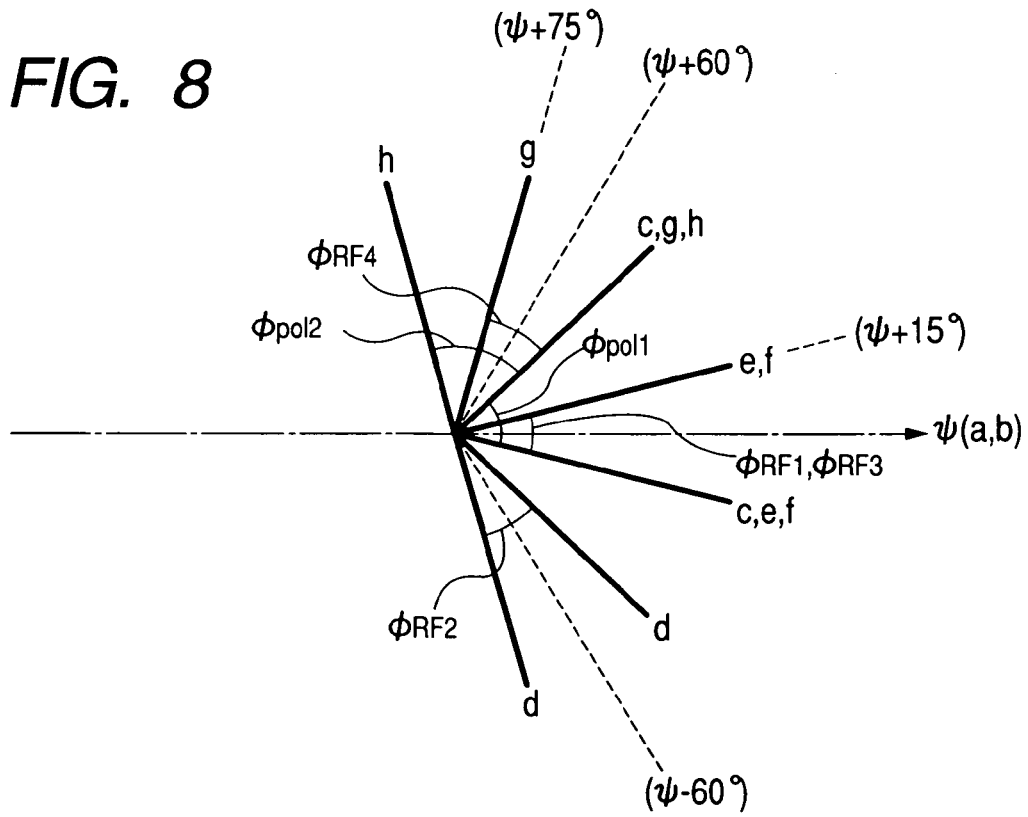
FIG. 8 is a diagram illustrating a second combination of the absorption axis c of the first polarizing plate, the slow axis d of the second retardation plate, the slow axis e of the first retardation plate, the alignment direction a of the upper alignment film, the alignment direction b of the lower alignment film, the slow axis f of the third retardation plate, the slow axis g of the fourth retardation plate, and the absorption axis h of the second polarizing plate in arrangement.

Further, as shown in FIG. 8, the slow axis e of the first retardation plate H2 is set such that the angle $\phi_{RF1}$ formed with respect to the center direction $\psi$ is in a range of $(\psi-15°)$ to $(\psi+15°)$, as viewed from the light incident side. When the slow axis e is not set in the above-mentioned range, high contrast and high brightness are not obtained in the transmissive mode and the reflective mode.

Furthermore, a retardation value $\Delta nd_{RF2}$ of the second retardation plate H3 is set in a range of 250 nm to 290 nm (a measured wavelength of 589 nm). When the retardation value $\Delta nd_{RF2}$ is outside the above-mentioned range, high contrast and high brightness are not obtained in the transmissive mode and the reflective mode.

As shown in FIG. 8, the slow axis d of the second retardation plate H3 is set such that the angle $\phi_{RF2}$ formed with respect to the center direction $\psi$ is in a range of $(\psi-60°)-15°$ to $(\psi-60°)+15°$, as viewed from the light incident side. When the slow axis d is not set in the above-mentioned range, high contrast and high brightness are not obtained in the transmissive mode and the reflective mode.

Further, a retardation value $\Delta nd_{RF3}$ of the third retardation plate H4 is set in a range of 80 nm to 120 nm (a measured wavelength of 589 nm). When the retardation value $\Delta nd_{RF3}$ is outside the above-mentioned range, high contrast and high brightness are not obtained in the transmissive mode and the reflective mode.

As shown in FIG. 8, the slow axis f of the third retardation plate H4 is set such that the angle $\phi_{RF3}$ formed with respect to the center direction $\psi$ is in a range of $(\psi-15°)$ to $(\psi+15°)$, as viewed from the light incident side. When the slow axis f is not set in the above-mentioned range, high contrast and high brightness are not obtained in the transmissive mode.

Furthermore, a retardation value $\Delta nd_{RF4}$ of the fourth retardation plate H5 is set in a range of 250 nm to 290 nm (a measured wavelength of 589 nm). When the retardation value $\Delta nd_{RF4}$ is outside the above-mentioned range, high contrast and high brightness are not obtained in the transmissive mode and the reflective mode.

As shown in FIG. 8, the slow axis g of the fourth retardation plate H5 is set such that the angle $\phi_{RF4}$ formed with respect to the center direction $\psi$ is in a range of $(\psi+60°)-15°$ to $(\psi+60°)+15°$, as viewed from the light incident side. When the slow axis g is not set in the above-mentioned range, high contrast and high brightness are not obtained in the transmissive mode.

Next, as shown in FIG. 8, the absorption axis c of the first polarizing plate H1 is set such that the angle $\phi_{pol1}$ formed with respect to the center direction $\psi$ is in a range of $(\psi+15°)-30°$ to $(\psi+15°)+30°$, as viewed from the light incident side. When the absorption axis c of the first polarizing plate H1 is not set in the above-mentioned range, good white display with high contrast is not obtained in the transmissive mode and the reflective mode.

Further, as shown in FIG. 8, the absorption axis h of the second polarizing plate H6 is set such that the angle $\Phi_{pol2}$ formed with respect to the center direction $\psi$ is in a range of $(\psi+75°)-30°$ to $(\psi+75°)+30°$, as viewed from the light incident side. When the absorption axis h of the second polarizing plate H6 is not set in the above-mentioned range, good white display with high contrast is not obtained in the transmissive mode.

Third Combination

Similar to the first combination, the first to fourth retardation plates H2 to H5 are composed of films formed of, for example, a uniaxially stretched norbornene-based resin material or polycarbonate, and the stretched direction is the slow axis.

A retardation value $\Delta nd_{RF1}$ of the first retardation plate H2 is set in a range of 80 nm to 120 nm (a measured wavelength of 589 nm). When the retardation value $\Delta nd_{RF1}$ is outside the above-mentioned range, high contrast and high brightness are not obtained in the transmissive mode and the reflective mode.

Figure 9:
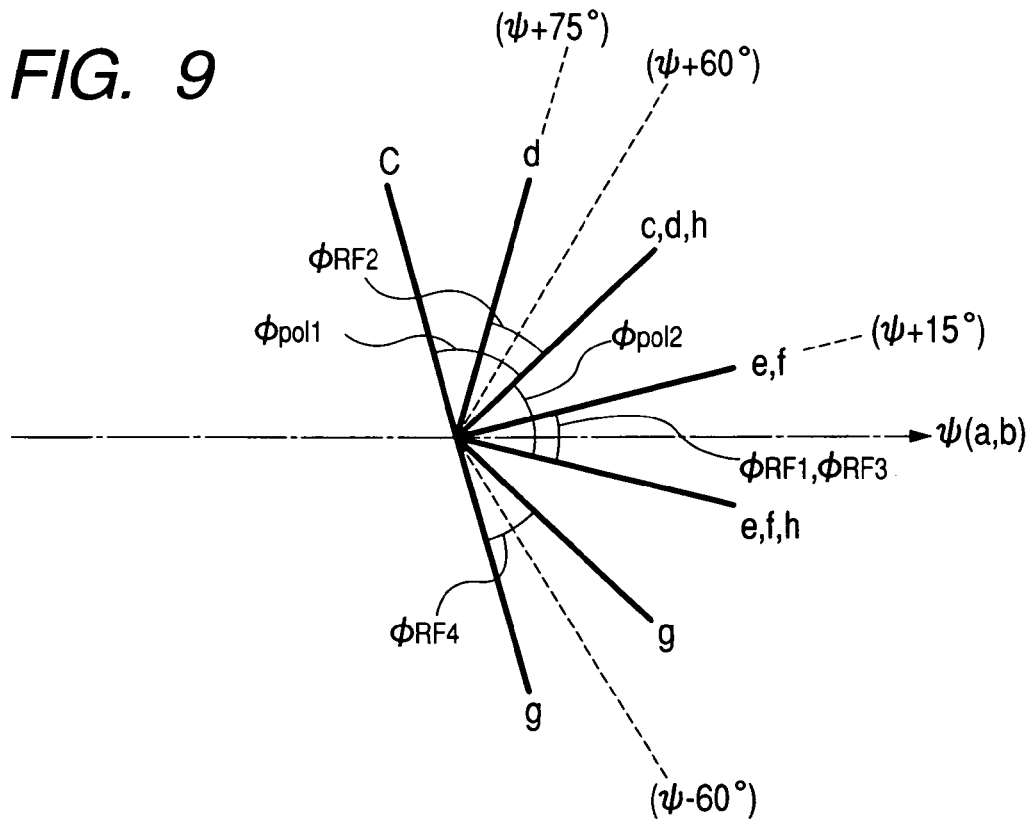
FIG. 9 is a diagram illustrating a third combination of the absorption axis c of the first polarizing plate, the slow axis d of the second retardation plate, the slow axis e of the first retardation plate, the alignment direction a of the upper alignment film, the alignment direction b of the lower alignment film, the slow axis f of the third retardation plate, the slow axis g of the fourth retardation plate, and the absorption axis h of the second polarizing plate in arrangement.

Further, as shown in FIG. 9, the slow axis e of the first retardation plate H2 is set such that the angle $\phi_{RF1}$ formed with respect to the center direction $\psi$ is in a range of $(\psi-15°)$ to $(\psi+15°)$, as viewed from the light incident side. When the slow axis e is not set in the above-mentioned range, high contrast and high brightness are not obtained in the transmissive mode and the reflective mode.

Furthermore, a retardation value $\psi nd_{RF2}$ of the second retardation plate H3 is set in a range of 250 nm to 290 nm (a measured wavelength of 589 nm). When the retardation value $\Delta nd_{RF2}$ is outside the above-mentioned range, high contrast and high brightness are not obtained in the transmissive mode and the reflective mode.

As shown in FIG. 9, the slow axis d of the second retardation plate H3 is set such that the angle $\phi_{RF2}$ formed with respect to the center direction $\psi$ is in a range of $(\psi+60°)-15°$ to $(\psi+60°)+15°$, as viewed from the light incident side. When the slow axis d is not set in the above-mentioned range, high contrast and high brightness are not obtained in the transmissive mode and the reflective mode.

Further, a retardation value $\Delta nd_{RF3}$ of the third retardation plate H4 is set in a range of 80 nm to 120 nm (a measured wavelength of 589 nm). When the retardation value $\Delta nd_{RF3}$ is outside the above-mentioned range, high contrast and high brightness are not obtained in the transmissive mode and the reflective mode.

As shown in FIG. 9, the slow axis f of the third retardation plate H4 is set such that the angle $\phi_{RF3}$ formed with respect to the center direction $\psi$ is in a range of $(\psi-15°)$ to $(\psi+15°)$, as viewed from the light incident side. When the slow axis f is not set in the above-mentioned range, high contrast and high brightness are not obtained in the transmissive mode.

Furthermore, a retardation value $\Delta nd_{RF4}$ of the fourth retardation plate H5 is set in a range of 250 nm to 290 nm (a measured wavelength of 589 nm). When the retardation value $\Delta nd_{RF4}$ is outside the above-mentioned range, high contrast and high brightness are not obtained in the transmissive mode and the reflective mode.

As shown in FIG. 9, the slow axis g of the fourth retardation plate H5 is set such that the angle $\phi_{RF4}$ formed with respect to the center direction $\psi$ is in a range of $(\psi+60°)-15°$ to $(\psi+60°)+15°$, as viewed from the light incident side. When the slow axis g is not set in the above-mentioned range, high contrast and high brightness are not obtained in the transmissive mode.

Next, as shown in FIG. 9, the absorption axis c of the first polarizing plate H1 is set such that the angle $\phi_{pol1}$ formed with respect to the center direction ψ is in a range of (ψ+75°)−30° to (ψ+75°)+30°, as viewed from the light incident side. When the absorption axis c of the first polarizing plate H1 is not set in the above-mentioned range, good white display with high contrast is not obtained in the transmissive mode and the reflective mode.

Further, as shown in FIG. 9, the absorption axis h of the second polarizing plate H6 is set such that the angle $\phi_{pol2}$ formed with respect to the center direction ψ is in a range of (ψ+15°)−30° to (ψ+15°)+30°, as viewed from the light incident side. When the absorption axis h of the second polarizing plate H6 is not set in the above-mentioned range, good white display with high contrast is not obtained in the transmissive mode.

Fourth Combination

Similar to the first combination, the first to fourth retardation plates H2 to H5 are composed of films formed of, for example, a uniaxially stretched norbornene-based resin material or polycarbonate, and the stretched direction is the slow axis.

A retardation value $\Delta nd_{RF1}$ of the first retardation plate H2 is set in a range of 80 nm to 120 nm (a measured wavelength of 589 nm). When the retardation value $\Delta nd_{RF1}$ is outside the above-mentioned range, high contrast and high brightness are not obtained in the transmissive mode and the reflective mode.

Figure 10:
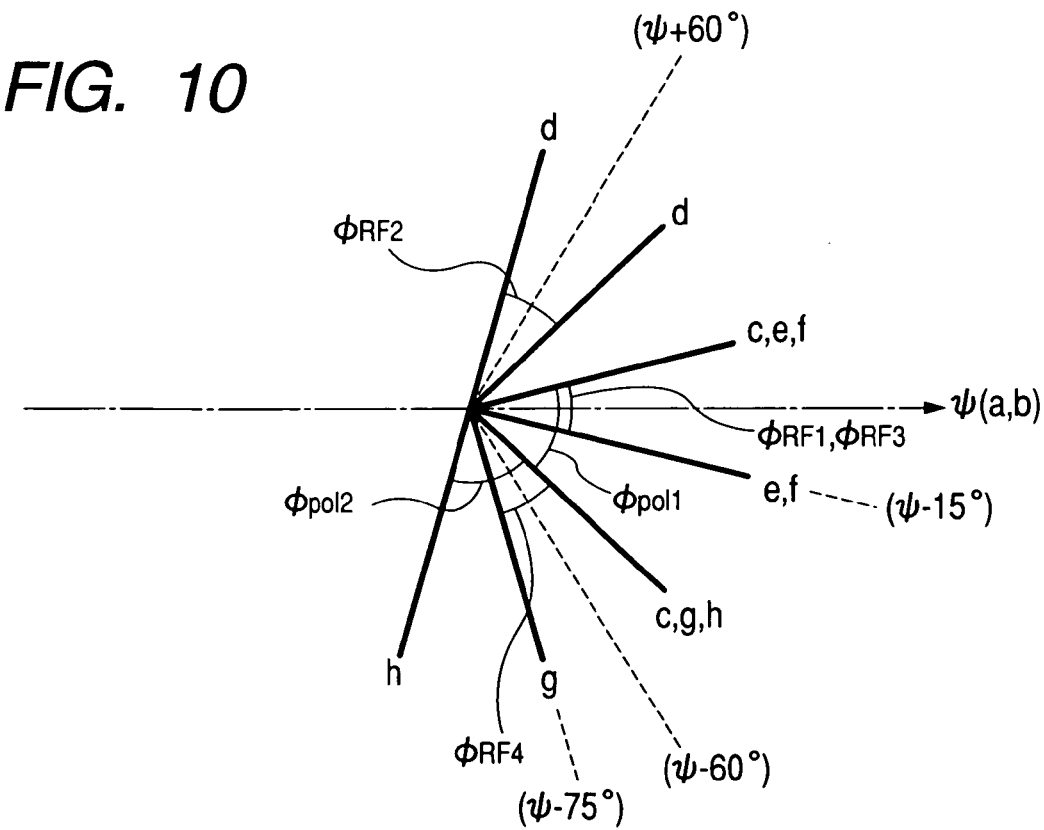
FIG. 10 is a diagram illustrating a fourth combination of the absorption axis c of the first polarizing plate, the slow axis d of the second retardation plate, the slow axis e of the first retardation plate, the alignment direction a of the upper alignment film, the alignment direction b of the lower alignment film, the slow axis f of the third retardation plate, the slow axis g of the fourth retardation plate, and the absorption axis h of the second polarizing plate in arrangement.

Further, as shown in FIG. 10, the slow axis e of the first retardation plate H2 is set such that the angle $\phi_{RF1}$ formed with respect to the center direction ψ is in a range of (ψ−15°) to (ψ+15°), as viewed from the light incident side. When the slow axis e is not set in the above-mentioned range, high contrast and high brightness are not obtained in the transmissive mode and the reflective mode.

Furthermore, a retardation value $\Delta nd_{RF2}$ of the second retardation plate H3 is set in a range of 250 nm to 290 nm (a measured wavelength of 589 nm). When the retardation value $\Delta nd_{RF2}$ is outside the above-mentioned range, high contrast and high brightness are not obtained in the transmissive mode and the reflective mode.

As shown in FIG. 10, the slow axis d of the second retardation plate H3 is set such that the angle $\phi_{RF2}$ formed with respect to the center direction ψ is in a range of (ψ+60°)−15° to (ψ+60°)+15°, as viewed from the light incident side. When the slow axis d is not set in the above-mentioned range, high contrast and high brightness are not obtained in the transmissive mode and the reflective mode.

Further, a retardation value $\Delta nd_{RF3}$ of the third retardation plate H4 is set in a range of 80 nm to 120 nm (a measured wavelength of 589 nm). When the retardation value $\Delta nd_{RF3}$ is outside the above-mentioned range, high contrast and high brightness are not obtained in the transmissive mode and the reflective mode.

As shown in FIG. 10, the slow axis f of the third retardation plate H4 is set such that the angle $\phi_{RF3}$ formed with respect to the center direction ψ is in a range of (ψ−15°) to (ψ+15°), as viewed from the light incident side. When the slow axis f is not set in the above-mentioned range, high contrast and high brightness are not obtained in the transmissive mode.

Furthermore, a retardation value $\Delta nd_{RF4}$ of the fourth retardation plate H5 is set in a range of 250 nm to 290 nm (a measured wavelength of 589 nm). When the retardation value $\Delta nd_{RF4}$ is outside the above-mentioned range, high contrast and high brightness are not obtained in the transmissive mode and the reflective mode.

As shown in FIG. 10, the slow axis g of the fourth retardation plate H5 is set such that the angle $\phi_{RF4}$ formed with respect to the center direction ψ is in a range of (ψ−60°)−15° to (ψ−60°)+15°, as viewed from the light incident side. When the slow axis g is not set in the above-mentioned range, high contrast and high brightness are not obtained in the transmissive mode.

Next, as shown in FIG. 10, the absorption axis c of the first polarizing plate H1 is set such that the angle $\phi_{pol1}$ formed with respect to the center direction ψ is in a range of (ψ+15°)−30° to (ψ+15°)+30°, as viewed from the light incident side. When the absorption axis c of the first polarizing plate H1 is not set in the above-mentioned range, good white display with high contrast is not obtained in the transmissive mode and the reflective mode.

Further, as shown in FIG. 10, the absorption axis h of the second polarizing plate H6 is set such that the angle $\phi_{pol2}$ formed with respect to the center direction ψ is in a range of (ψ−75°)−30° to (ψ−75°)+30°, as viewed from the light incident side. When the absorption axis h of the second polarizing plate H6 is not set in the above-mentioned range, good white display with high contrast is not obtained in the transmissive mode.

Next, the reflector 20 will be described in detail.

Figure 11:
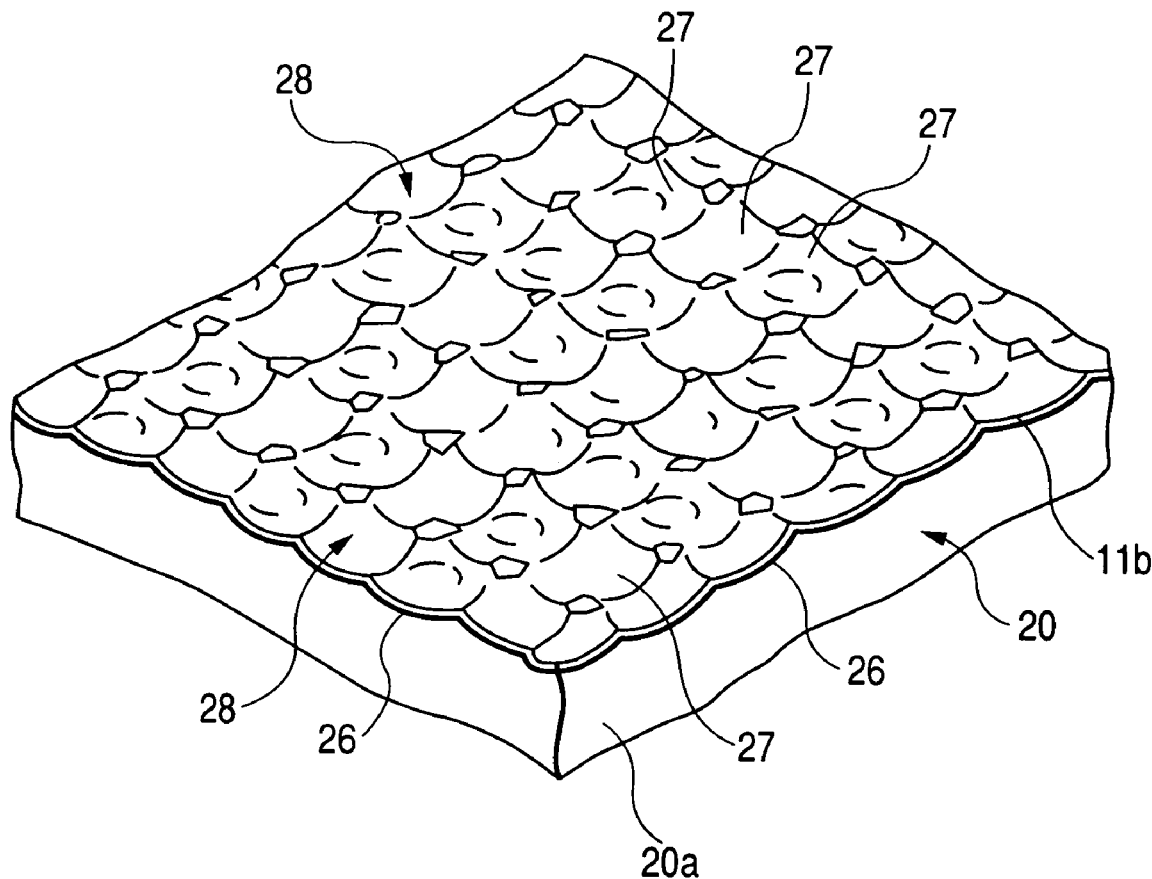
FIG. 11 is a perspective view illustrating concave portions of a reflector of the liquid crystal cell.

As shown in FIGS. 2 and 11, a plurality of concave portions 27 is provided on the surface of the insulating film 20a constituting the reflector 20 at positions corresponding to the pixel regions by, for example, pressing a transfer mold against the insulating film 20a. As shown in FIG. 11, the plurality of concave portions 27 allows the reflective pixel electrodes 11b to have predetermined concave surfaces 28. Light incident on the liquid crystal panel is partially dispersed by the plurality of concave portions 27 formed in the reflective pixel electrodes 11b, which causes the liquid crystal display device to have a diffused reflection function in which bright display is obtained at a wider viewing angle. In addition, as shown in FIG. 11, the concave portions 27 are arranged closely adjacent to each other in the right and left directions such that portions of the inner surfaces thereof are continuous with each other.

Figure 12:
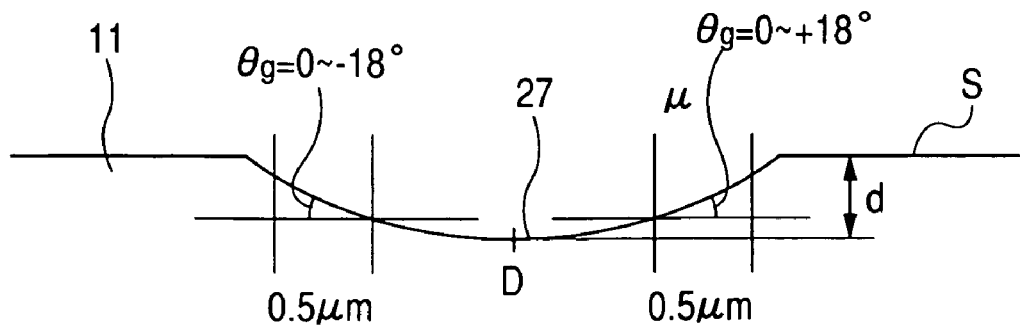
FIG. 12 is a cross-sectional view of the concave portion shown in FIG. 11.
Figure 13:
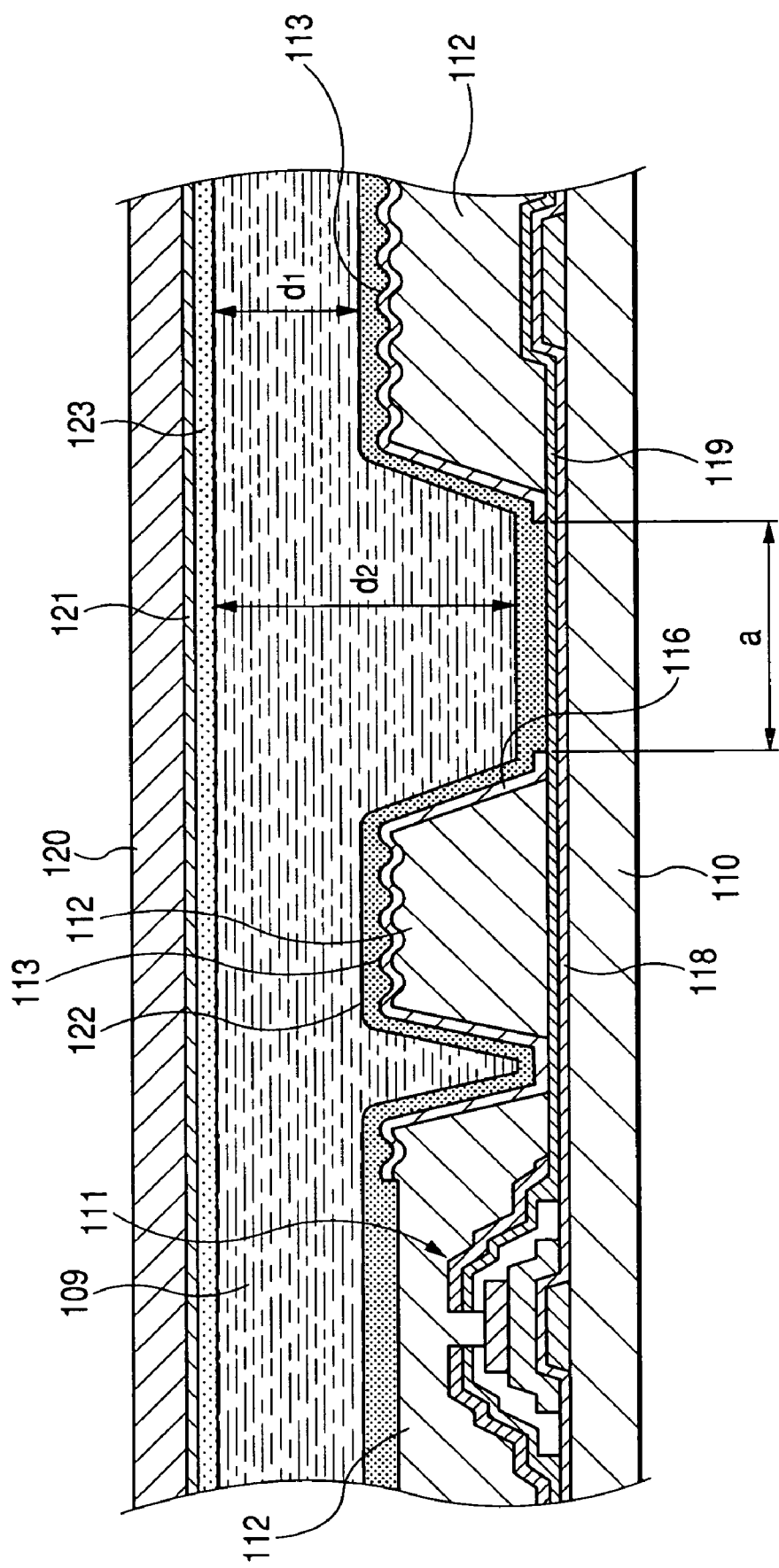
FIG. 13 is a cross-sectional view illustrating a liquid crystal cell provided in a liquid crystal display device according to the related art.

In this embodiment, the inner surface of each concave portion 27 is formed in a spherical shape. When light is incident on the reflective pixel electrode 11b at a predetermined angle (for example, an angle of 30°), the bright distribution of light diffused and reflected from the reflective pixel electrode 11b is symmetric with a specular reflection angle in a wide range. More specifically, as shown in FIG. 12, an inclination angle θg of the inner surface of the concave portion 27 is set in a range of, for example, −18° to +18°. In particular, the peripheral portions of adjacent concave portions are steeply formed, and the inclination thereof is discontinuous between the adjacent concave portions, so that the inclination angle has a predetermined value. In addition, pitches between adjacent concave portions 27 are randomly set, and thus it is possible to prevent the occurrence of moiré fringes due to the arrangement of the concave portions 27.

Further, the diameters of the concave portions 27 are set in a range of 5 μm to 100 μm, making it easy to manufacture them. In addition, the depths of the concave portions 27 are set in a range of 0.1 μm to 3 μm.

Furthermore, in order to simplify the drawings, the concave portions 27 formed in the reflective pixel electrodes 11b are not shown in the plan view shown in FIG. 4. However, since the reflective pixel electrode 11b has a size of 100 to 200 μm by 30 to 90 μm in a general liquid crystal panel, an example of the relative size of the concave portion 27 to the reflective pixel electrode 11b is represented by a solid line in one pixel shown in FIG. 4

In this embodiment, the depth of the concave portion 27 means the distance from a portion of the reflective pixel electrode 11b where the concave portion 27 is not formed to the bottom of the concave portion 27, and the pitch between adjacent concave portions 27 means a distance between the centers of the concave portions 27 having circular shapes in plan view. In addition, the inclination angle of the inner surface of the concave portion 27 means the angle θg of an inclined plane with respect to the horizontal surface (the surface of the substrate 6) in a very small width range of about 0.5 μm at an arbitrary point on the inner surface of the concave portion 27, as shown in FIG. 12. The positive or negative value of the angle θg is defined in such a way that, as shown in FIG. 12, an inclined plane on the right side of the normal line to the surface of a portion of the reflective pixel electrode 11b where the concave portion 27 is not formed has a positive value and an inclined plane on the left side thereof has a negative value.

As described above, according to the transflective liquid crystal display device A of this embodiment, since the optical characteristics of the liquid crystal cell 1, the retardation plates H2 to H5, and the polarizing plates H1 and H6 are set in the above-mentioned ranges, it is possible to achieve good white display with high contrast and high brightness in the transmissive mode and the reflective mode.

Further, it is possible to obtain uniform display in both the transmissive portion 30 and the reflective portion 35, and to prevent display irregularity. In particular, it is possible to prevent contrast irregularity. In addition, since the retardation values ($\Delta nd_{LT}$ and $\Delta nd_{LR}$) of the liquid crystal cell 1 relate to the function of the twist angle φ of the liquid crystal layer 5, it is possible to easily optimize optical characteristics by controlling the absolute angles of the alignment directions a and b of the alignment films 44 and 29.

Furthermore, since the thickness of the color filter 42a in the reflective portion 35 is set to be half the thickness of the color filter 42c in the transmissive portion 30, it is possible to prevent the occurrence of color irregularity in the transmissive portion 30 and the reflective portion 35 and thus to maintain uniform contrast. In addition, it is possible to improve brightness.

Moreover, since the transparent resin layer 42b in the reflective portion 35 and the color filter 42c in the transmissive portion 30 form the same surface on the liquid crystal layer 5, it is possible to easily control the cell gap of the liquid crystal cell 1.

Further, since the thickness $d_3$ of the liquid crystal layer in the transmissive portion 30 is two times the thickness $d_4$ of the liquid crystal layer 5 in the reflective portion 35, it is possible to make the length of an optical path of light passing through the liquid crystal layer 5 in the reflective portion substantially equal to that of an optical path of light passing through the liquid crystal layer 5 in the transmissive portion 30.

EXAMPLES

Next, the invention will be described in detail by using examples. However, the invention is not limited to the following examples.

The display characteristics of the transflective liquid crystal display device shown in FIGS. 1 to 12 in the reflective mode and the transmissive mode are examined.

Alignment films PIA-5560 (trademark; manufactured by CHISSO CORPORATION) are used as the upper and lower alignment films constituting the liquid crystal cell, and an alignment process is performed on the liquid crystal such that a twist angle thereof is in a range of 4 to 8°. The alignment direction a of the upper alignment film is set such that the angle thereof with respect to the normal direction X is in a range of +5° to +15°, as viewed from the light incident side, and the alignment direction b of the lower alignment film is set such that the angle thereof with respect to the normal direction X is in a range of −5° to −15°, as viewed from the light incident side. AP-5514LA (trademark; manufactured by CHISSO PETROCHEMICAL CORPORATION) is used as the liquid crystal of the liquid crystal layer. All the first to fourth retardation plates are formed of ZEONOR.

The reflector is formed by forming uneven portions on the surface of an acryl-based photosensitive resin base (a resin base for a reflector) using a silicon mold having an uneven surface, by radiating ultraviolet rays onto the photosensitive resin base to harden it, and by forming an Al film (reflective pixel electrodes) on the photosensitive resin base. As shown in FIGS. 11 and 12, the uneven surface of the reflector has concave portions each constituting a spherical surface.

The retardation values $\Delta nd_{LT}$ and $\Delta nd_{LR}$ (a measured wavelength of 589 nm) of the liquid crystal cell, the retardation values $\Delta nd_{RF1}$ to $\Delta nd_{RF4}$, the angles between the slow axes d to g and the center direction ψ, and the angles between the absorption axes c and h of the first and second polarizing plates and the center direction ψ are set as shown in Table 1 (examples 1 to 10).

In the following description, values ψ±N° (N is an integer) indicate the directions of the slow axes of each retardation plate, that is, positive and negative angles N formed with respect to the center direction ψ which divides a narrow angle between the alignment directions a and b into two equal angles. ψ−N° indicates an angle rotating on an intersecting point O from the center direction ψ by an angle of N° in the counterclockwise direction, as viewed from the counter substrate 3. ψ+N° indicates an angle rotating on the intersecting point O from the center direction ψ by an angle of N° in the clockwise direction, as viewed from the counter substrate 3.

In reflective liquid crystal display devices according to examples 1 to 10, the brightness, contrast, and distances from a light source are measured in the transmissive mode and the reflective mode.

In the reflective mode, in a case in which light emitted from a light source is incident on the liquid crystal cell at an angle of −30° with respect to the Z direction (the normal direction) of FIG. 6, that is, the direction rotating from the liquid crystal cell by an angle of 90° in the counterclockwise direction, when reflected light is received at an acceptance angle of 0° in the Z direction, the brightness of white display (a voltage of 0.1 V is applied) and the brightness of black display (a voltage of 5.0 V is applied) are measured in a normally white display mode (N/W), and the contrast ratio thereof is calculated, in the order of the light source, the liquid crystal cell, and the backlight.

In the transmissive mode, when light emitted from a light source is incident on the liquid crystal cell and then transmission light in the Z direction is received at an acceptance angle of 0°, the brightness of white display (0.1 V is applied) and the brightness of black display (a voltage of 0.1 V is applied) are measured in a normally white display mode (N/W), and the contrast ratio thereof is calculated, in the order of the light source, the liquid crystal cell, and the backlight.

Further, from the measured results in the transmissive mode and the reflective mode, it is determined that the quality of the display devices of the examples 1 to 10 is good (represented by a symbol '○') or bad (represented by a symbol 'X'). According to the criterion of the determination, the display device satisfying the following conditions is determined as a good product (○): transmittance/reflectance≧30%; contrast≧100; and the distance from the light source≦0.03. On the other hand, the display device not satisfying all the above conditions is determined as a bad product (X).

The results are shown in Table 2.

TABLE 1

|  | First polarizing plate | Second retardation plate | | First retardation plate | | Liquid crystal layer | | |
|---|---|---|---|---|---|---|---|---|
|  | Absorption axis c (°) | Retardation $\Delta nd_{RF2}$ (nm) | Slow axis d (°) | Retardation $\Delta nd_{RF1}$ (nm) | Slow axis e (°) | Twist angle $\phi$ (°) | Retardation of reflective portion $\Delta nd_{LR}$ (nm) | Retardation of transmissive portion $\Delta nd_{LT}$ (nm) |
| Example 1 | ($\psi$ + 25°) | 275 | ($\psi$ − 50°) | 105 | ($\psi$ + 10°) | 10 | 132 | 264 |
| Example 2 | ($\psi$ + 25°) | 275 | ($\psi$ − 50°) | 105 | ($\psi$ + 10°) | 10 | 165 | 330 |
| Example 3 | ($\psi$ + 25°) | 275 | ($\psi$ − 50°) | 105 | ($\psi$ + 10°) | 10 | 198 | 396 |
| Example 4 | ($\psi$ + 25°) | 265 | ($\psi$ − 50°) | 105 | ($\psi$ + 10°) | 20 | 132 | 264 |
| Example 5 | ($\psi$ + 25°) | 275 | ($\psi$ − 50°) | 105 | ($\psi$ + 10°) | 10 | 165 | 330 |
| Example 6 | ($\psi$ + 25°) | 265 | ($\psi$ − 50°) | 105 | ($\psi$ + 10°) | 20 | 198 | 396 |
| Example 7 | ($\psi$ + 15°) | 280 | ($\psi$ − 55°) | 110 | ($\psi$ + 10°) | 30 | 132 | 264 |
| Example 8 | ($\psi$ + 15°) | 280 | ($\psi$ − 55°) | 110 | ($\psi$ + 10°) | 30 | 165 | 330 |
| Example 9 | ($\psi$ + 15°) | 280 | ($\psi$ − 55°) | 110 | ($\psi$ + 10°) | 30 | 198 | 396 |
| Example 10 | ($\psi$ + 15°) | 280 | ($\psi$ − 55°) | 110 | ($\psi$ + 10°) | 30 | 231 | 462 |

|  | Third retardation plate | | Fourth retardation plate | | Second polarizing plate |
|---|---|---|---|---|---|
|  | Retardation $\Delta nd_{RF3}$ (nm) | Slow axis d (°) | Retardation $\Delta nd_{RF4}$ (nm) | Slow axis d (°) | Absorption axis h (°) |
| Example 1 | 115 | ($\psi$ − 175°) | 280 | ($\psi$ − 105°) | ($\psi$ − 75°) |
| Example 2 | 115 | ($\psi$ − 175°) | 280 | ($\psi$ − 105°) | ($\psi$ − 75°) |
| Example 3 | 115 | ($\psi$ − 175°) | 280 | ($\psi$ − 105°) | ($\psi$ − 75°) |
| Example 4 | 135 | ($\psi$ − 170°) | 280 | ($\psi$ − 105°) | ($\psi$ − 80°) |
| Example 5 | 135 | ($\psi$ − 175°) | 280 | ($\psi$ − 105°) | ($\psi$ − 75°) |
| Example 6 | 135 | ($\psi$ − 170°) | 280 | ($\psi$ − 105°) | ($\psi$ − 80°) |
| Example 7 | 135 | ($\psi$ − 170°) | 280 | ($\psi$ − 105°) | ($\psi$ − 80°) |
| Example 8 | 135 | ($\psi$ − 170°) | 280 | ($\psi$ − 105°) | ($\psi$ − 80°) |
| Example 9 | 135 | ($\psi$ − 170°) | 280 | ($\psi$ − 105°) | ($\psi$ − 80°) |
| Example 10 | 135 | ($\psi$ − 170°) | 280 | ($\psi$ − 105°) | ($\psi$ − 80°) |

TABLE 2

|  | Reflective portion | | | Transmissive portion | | | Result of determination |
|---|---|---|---|---|---|---|---|
|  | Brightness | Contrast ratio | Distance from light source | Brightness | Contrast ratio | Distance from light source |  |
| Example 1 | 0.328 | 301.4 | 0.021 | 0.348 | 454.2 | 0.018 | ○ |
| Example 2 | 0.331 | 272.2 | 0.029 | 0.349 | 370.2 | 0.024 | ○ |
| Example 3 | 0.333 | 254.8 | 0.044 | 0.352 | 300.8 | 0.048 | X |
| Example 4 | 0.325 | 248.3 | 0.018 | 0.325 | 404.2 | 0.016 | ○ |
| Example 5 | 0.327 | 255.2 | 0.024 | 0.327 | 350.2 | 0.023 | ○ |
| Example 6 | 0.327 | 217.0 | 0.037 | 0.327 | 284.6 | 0.039 | X |
| Example 7 | 0.308 | 277.6 | 0.012 | 0.308 | 364.3 | 0.012 | ○ |
| Example 8 | 0.325 | 236.6 | 0.018 | 0.311 | 320.7 | 0.017 | ○ |
| Example 9 | 0.327 | 222.1 | 0.029 | 0.314 | 250.2 | 0.027 | ○ |
| Example 10 | 0.331 | 164.9 | 0.041 | 0.317 | 200.8 | 0.042 | X |

As can be apparently seen from the results shown in Tables 1 and 2, in the display devices of the examples 3, 6, and 10, the retardation values $\Delta nd_{LT}$ and $\Delta nd_{LR}$ of the liquid crystal cell are not in the preferable range. Therefore, these display devices have a low contrast ratio in the transmissive mode and the reflective mode, and thus are determined as bad products (X).

On the other hand, in the other display devices (the examples 1, 2, 4, 5, 7, 8, and 9), all the optical characteristics of the liquid crystal cell, the first to fourth retardation plates, and the first and second polarizing plates are in the preferable ranges. Therefore, these display devices have a high contrast ratio, and thus are determined as good products (○).

As described above, according to the invention, it is possible to provide a liquid crystal display device having uniform brightness and no color irregularity by optimizing optical characteristics of the liquid crystal cell, the polarizing plates, and the retardation plates.

The invention claimed is:

1. A liquid crystal display device comprising:
a liquid crystal cell that includes:
a pair of transparent substrates which are arranged opposite to each other;
a liquid crystal layer which is provided between the pair of transparent substrates;
a common electrode and an alignment film that are sequentially provided on an inner surface of one of the transparent substrates;
a plurality of switching elements which are provided on an inner surface of the other substrate of the transparent substrates;
a plurality of pixel electrodes which are connected to the respective switching elements; and
an alignment film that is provided on the switching elements and the pixel electrodes;
first and second retardation plates and a first polarizing plate that are sequentially formed on an outer surface of the one transparent substrate; and
third and fourth retardation plates and a second polarizing plate that are sequentially formed on an outer surface of the other transparent substrate,
wherein a plurality of pixel regions corresponding to the pixel electrodes are formed in the liquid crystal cell,
a portion of each pixel region having a reflective pixel electrode serves as a reflective portion,
the reflective portion has a reflector that reflects light incident from the other transparent substrate,
the other portion of each pixel region serves as a transmissive portion that transmits light from the other transparent substrate to the one transparent substrate, and
optical characteristics of the liquid crystal cell, the first to fourth retardation plates, and the first and second polarizing plates are set so as to the following conditions:
the direction of an absorption axis c of the first polarizing plate: $(\psi-75°)-30°$ to $(\psi-75°)+30°$;
a retardation value $\Delta nd_{RF2}$ of the second retardation plate: 250 nm to 290 nm;
the direction of a slow axis d of the second retardation plate: $(\psi-60°)-15°$ to $(\psi-60°)+15°$;
a retardation value $\Delta nd_{RF1}$ of the first retardation plate: 80 nm to 120 nm;
the direction of a slow axis e of the first retardation plate: $(\psi-15°)$ to $(\psi+15°)$;
a twist angle $\phi$ of the liquid crystal layer: 0° to 40°;
a retardation value $\Delta nd_{LT}$ of the transmissive portion of the liquid crystal cell which is set to satisfy the following expression 1:

$$|\Delta nd_{LT}-550\sqrt{(1/2)^2+(\phi/180)^2}|\leq 100 (nm);\qquad \text{[Expression 1]}$$

a retardation value $\Delta nd_{LR}$ of the reflective portion of the liquid crystal cell which is set to satisfy the following expression 2:

$$|\Delta nd_{LR}-550\sqrt{(1/4)^2+(\phi/180)^2}|\leq 40 (nm);\qquad \text{[Expresssion 2]}$$

a retardation value $\Delta nd_{RF3}$ of the third retardation plate: 80 nm to 120 nm;
the direction of a slow axis f of the third retardation plate: $(\psi-15°)$ to $(\psi+15°)$;
a retardation value $\Delta nd_{RF4}$ of the fourth retardation plate: 250 nm to 290 nm;
the direction of a slow axis g of the fourth retardation plate: $(\psi+60°)-15°$ to $(\psi+60°)+15°$; and
the direction of an absorption axis h of the second polarizing plate: $(\psi-15°)-30°$ to $(\psi-15°)+30°$,
where, when the alignment direction of the alignment film formed on the one transparent substrate is a direction a, the alignment direction of the alignment film formed on the other transparent substrate is a direction b, and the a direction that divides a narrow angle formed between the directions a and b into two equal angles is a center direction $\psi$, $\psi\pm N°$ (N is an integer) indicates the directions of each axis indicates, that is, positive and negative angles N with respect to the center direction $\psi$,
$\psi-N°$ indicates an angle rotating on an intersecting point O from the center direction $\psi$ by an angle of N° in the clockwise direction, as viewed from the one transparent substrate, and
$\psi+N°$ indicates an angle rotating on the intersecting point O from the center direction $\psi$ by an angle of N° in the counter clockwise direction, as viewed from the one transparent substrate.

2. The liquid crystal display device according to claim 1, wherein the pixel electrode in the reflective portion is the reflective pixel electrode composed of a metal film, and the pixel electrode in the transmissive portion is a transmissive pixel electrode composed of a transparent conductive film.

3. The liquid crystal display device according to claim 1, wherein color filters are provided between the one transparent substrate and the common electrode, and the thickness of the color filter in the reflective portion is smaller than that of the color filter in the transmissive portion.

4. The liquid crystal display device according to claim 1, wherein color filters are provided between the one transparent substrate and the common electrode, the thickness of the color filter in the reflective portion is smaller than that of the color filter in the transmissive portion, and a transparent resin layer is formed on a surface of each color filter facing the liquid crystal layer in the reflective portion, so that the total thickness of the color filter and the transparent resin layer in the reflective portion is equal to the thickness of the color filter in the transmissive portion.

5. The liquid crystal display device according to claim 1, wherein the thickness of the liquid crystal layer in the transmissive portion is about two times the thickness of the liquid crystal layer in the reflective portion.

6. The liquid crystal display device according to claim 1,
wherein the pixel electrode in the reflective portion is the reflective pixel electrode composed of a metal film, and the pixel electrode in the transmissive portion is a transmissive pixel electrode composed of a transparent conductive film,
a step portion of the reflector is arranged adjacent to the transmissive pixel electrode, and
an inclination angle of the step portion is set in a range of 25° to 55°.

7. The liquid crystal display device according to claim 1,
wherein the twist angle of the liquid crystal layer is set in a range of 0° to 30°.

8. A liquid crystal display device comprising:
a liquid crystal cell that includes:
a pair of transparent substrates which are arranged opposite to each other;
a liquid crystal layer which is provided between the pair of transparent substrates;
a common electrode and an alignment film that are sequentially provided on an inner surface of one of the transparent substrates;
a plurality of switching elements which are provided on an inner surface of the other substrate of the transparent substrates;
a plurality of pixel electrodes which are connected to the respective switching elements; and
an alignment film that is provided on the switching elements and the pixel electrodes;
first and second retardation plates and a first polarizing plate that are sequentially formed on an outer surface of the one transparent substrate; and
third and fourth retardation plates and a second polarizing plate that are sequentially formed on an outer surface of the other transparent substrate,
wherein a plurality of pixel regions corresponding to the pixel electrodes are formed in the liquid crystal cell,
a portion of each pixel region having a reflective pixel electrode serves as a reflective portion,
the reflective portion has a reflector that reflects light incident from the other transparent substrate,
the other portion of each pixel region serves as a transmissive portion that transmits light from the other transparent substrate to the one transparent substrate, and
optical characteristics of the liquid crystal cell, the first to fourth retardation plates, and the first and second polarizing plates are set so as to the following conditions:
the direction of an absorption axis c of the first polarizing plate: $(\psi+15°)-30°$ to $(\psi+15°)+30°$;
a retardation value $\Delta nd_{RF2}$ of the second retardation plate: 250 nm to 290 nm;
the direction of a slow axis d of the second retardation plate: $(\psi-60°)-15°$ to $(\psi-60°)+15°$;
a retardation value $\Delta nd_{RF1}$ of the first retardation plate: 80 nm to 120 nm;
the direction of a slow axis e of the first retardation plate: $(\psi-15°)$ to $(\psi+15°)$;
a twist angle $\phi$ of the liquid crystal layer: 0° to 40°;
a retardation value $\Delta nd_{LT}$ of the transmissive portion of the liquid crystal cell which is set to satisfy the following expression 3:

$$|\Delta nd_{LT} - 550\sqrt{(1/2)^2 + (\phi/180)^2}| \leq 100 (nm); \quad \text{[Expression 3]}$$

a retardation value $\Delta nd_{LR}$ of the reflective portion of the liquid crystal cell which is set to satisfy the following expression 4:

$$|\Delta nd_{LR} - 550\sqrt{(1/4)^2 + (\phi/180)^2}| \leq 40 (nm); \quad \text{[Expression 4]}$$

a retardation value $\Delta nd_{RF3}$ of the third retardation plate: 80 nm to 120 nm;
the direction of a slow axis f of the third retardation plate: $(\psi-15°)$ to $(\psi+15°)$;
a retardation value $\Delta nd_{RF4}$ of the fourth retardation plate: 250 nm to 290 nm;
the direction of a slow axis g of the fourth retardation plate: $(\psi+60°)-15°$ to $(\psi+60°)+15°$; and
the direction of an absorption axis h of the second polarizing plate: $(\psi+75°)-30°$ to $(\psi+75°)+30°$,
where, when the alignment direction of the alignment film formed on the one transparent substrate is a direction a, the alignment direction of the alignment film formed on the other transparent substrate is a direction b, and the a direction that divides a narrow angle formed between the directions a and b into two equal angles is a center direction $\psi$, $\psi \pm N°$ (N is an integer) indicates the directions of each axis indicates, that is, positive and negative angles N with respect to the center direction $\psi$,
$\psi-N°$ indicates an angle rotating on an intersecting point O from the center direction $\psi$ by an angle of N° in the clockwise direction, as viewed from the one transparent substrate, and
$\psi+N°$ indicates an angle rotating on the intersecting point O from the center direction $\psi$ by an angle of N° in the counter clockwise direction, as viewed from the one transparent substrate.

9. The liquid crystal display device according to claim 8,
wherein the pixel electrode in the reflective portion is the reflective pixel electrode composed of a metal film, and the pixel electrode in the transmissive portion is a transmissive pixel electrode composed of a transparent conductive film.

10. The liquid crystal display device according to claim 8,
wherein color filters are provided between the one transparent substrate and the common electrode, and
the thickness of the color filter in the reflective portion is smaller than that of the color filter in the transmissive portion.

11. The liquid crystal display device according to claim 8,
wherein color filters are provided between the one transparent substrate and the common electrode,
the thickness of the color filter in the reflective portion is smaller than that of the color filter in the transmissive portion, and
a transparent resin layer is formed on a surface of each color filter facing the liquid crystal layer in the reflective portion, so that the total thickness of the color filter and the transparent resin layer in the reflective portion is equal to the thickness of the color filter in the transmissive portion.

12. The liquid crystal display device according to claim 8,
wherein the thickness of the liquid crystal layer in the transmissive portion is about two times the thickness of the liquid crystal layer in the reflective portion.

13. The liquid crystal display device according to claim 8,
wherein the pixel electrode in the reflective portion is the reflective pixel electrode composed of a metal film, and the pixel electrode in the transmissive portion is a transmissive pixel electrode composed of a transparent conductive film, a step portion of the reflector is arranged adjacent to the transmissive pixel electrode, and an inclination angle of the step portion is set in a range of 25° to 55°.

14. The liquid crystal display device according to claim 8, wherein the twist angle of the liquid crystal layer is set in a range of 0° to 30°.

15. A liquid crystal display device comprising:

a liquid crystal cell that includes:

a pair of transparent substrates which are arranged opposite to each other;

a liquid crystal layer which is provided between the pair of transparent substrates;

a common electrode and an alignment film that are sequentially provided on an inner surface of one of the transparent substrates;

a plurality of switching elements which are provided on an inner surface of the other substrate of the transparent substrates;

a plurality of pixel electrodes which are connected to the respective switching elements; and an alignment film that is provided on the switching elements and the pixel electrodes;

first and second retardation plates and a first polarizing plate that are sequentially formed on an outer surface of the one transparent substrate; and third and fourth retardation plates and a second polarizing plate that are sequentially formed on an outer surface of the other transparent substrate, wherein a plurality of pixel regions corresponding to the pixel electrodes are formed in the liquid crystal cell, a portion of each pixel region having a reflective pixel electrode serves as a reflective portion, the reflective portion has a reflector that reflects light incident from the other transparent substrate, the other portion of each pixel region serves as a transmissive portion that transmits light from the other transparent substrate to the one transparent substrate, and optical characteristics of the liquid crystal cell, the first to fourth retardation plates, and the first and second polarizing plates are set so as to the following conditions:

the direction of an absorption axis c of the first polarizing plate: $(\psi+75°)-30°$ to $(\psi+75°)+30°$;

a retardation value $\Delta nd_{RF2}$ of the second retardation plate: 250 nm to 290 nm;

the direction of a slow axis d of the second retardation plate: $(\psi+60°)-15°$ to $(\psi+60°)+15°$;

a retardation value $\Delta nd_{RF1}$ of the first retardation plate: 80 nm to 120 nm;

the direction of a slow axis e of the first retardation plate: $(\psi-15°)$ to $(\psi+15°)$;

a twist angle $\phi$ of the liquid crystal layer: 0° to 40°;

a retardation value $\Delta nd_{LT}$ of the transmissive portion of the liquid crystal cell which is set to satisfy the following expression 5:

$$|\Delta nd_{LT}-550\sqrt{(\tfrac{1}{2})^2+(\phi/180)^2}|\leq 100 (nm);$$ [Expression 5]

a retardation value $\Delta nd_{LR}$ of the reflective portion of the liquid crystal cell which is set to satisfy the following expression 6:

$$|\Delta nd_{LR}-550\sqrt{(\tfrac{1}{4})^2+(\phi/180)^2}|\leq 40 (nm);$$ [Expression 6]

a retardation value $\Delta nd_{RF3}$ of the third retardation plate: 80 nm to 120 nm;

the direction of a slow axis f of the third retardation plate: $(\psi-15°)$ to $(\psi+15°)$;

a retardation value $\Delta nd_{RF4}$ of the fourth retardation plate: 250 nm to 290 nm;

the direction of a slow axis g of the fourth retardation plate: $(\psi-60°)-15°$ to $(\psi-60°)+15°$; and the direction of an absorption axis h of the second polarizing plate: $(\psi+15°)-30°$ to $(\psi+15°)+30°$, where, when the alignment direction of the alignment film formed on the one transparent substrate is a direction a, the alignment direction of the alignment film formed on the other transparent substrate is a direction b, and the a direction that divides a narrow angle formed between the directions a and b into two equal angles is a center direction $\psi$, $\psi\pm N°$ (N is an integer) indicates the directions of each axis indicates, that is, positive and negative angles N with respect to the center direction $\psi$, $\psi-N°$ indicates an angle rotating on an intersecting point O from the center direction $\psi$ by an angle of N° in the clockwise direction, as viewed from the one transparent substrate, and $\psi+N°$ indicates an angle rotating on the intersecting point O from the center direction $\psi$ by an angle of N° in the counter clockwise direction, as viewed from the one transparent substrate.

16. The liquid crystal display device according to claim 15, wherein the pixel electrode in the reflective portion is the reflective pixel electrode composed of a metal film, and the pixel electrode in the transmissive portion is a transmissive pixel electrode composed of a transparent conductive film.

17. The liquid crystal display device according to claim 15, wherein color filters are provided between the one transparent substrate and the common electrode, and the thickness of the color filter in the reflective portion is smaller than that of the color filter in the transmissive portion.

18. The liquid crystal display device according to claim 15, wherein color filters are provided between the one transparent substrate and the common electrode, the thickness of the color filter in the reflective portion is smaller than that of the color filter in the transmissive portion, and a transparent resin layer is formed on a surface of each color filter facing the liquid crystal layer in the reflective portion, so that the total thickness of the color filter and the transparent resin layer in the reflective portion is equal to the thickness of the color filter in the transmissive portion.

19. The liquid crystal display device according to claim 15, wherein the thickness of the liquid crystal layer in the transmissive portion is about two times the thickness of the liquid crystal layer in the reflective portion.

20. The liquid crystal display device according to claim 15, wherein the pixel electrode in the reflective portion is the reflective pixel electrode composed of a metal film, and the pixel electrode in the transmissive portion is a transmissive pixel electrode composed of a transparent conductive film, a step portion of the reflector is arranged adjacent to the transmissive pixel electrode, and an inclination angle of the step portion is set in a range of 25° to 55°.

21. The liquid crystal display device according to claim 15, wherein the twist angle of the liquid crystal layer is set in a range of 0° to 30°.

22. A liquid crystal display device comprising:
a liquid crystal cell that includes:
a pair of transparent substrates which are arranged opposite to each other;
a liquid crystal layer which is provided between the pair of transparent substrates;
a common electrode and an alignment film that are sequentially provided on an inner surface of one of the transparent substrates;
a plurality of switching elements which are provided on an inner surface of the other substrate of the transparent substrates;
a plurality of pixel electrodes which are connected to the respective switching elements; and
an alignment film that is provided on the switching elements and the pixel electrodes;
first and second retardation plates and a first polarizing plate that are sequentially formed on an outer surface of the one transparent substrate; and
third and fourth retardation plates and a second polarizing plate that are sequentially formed on an outer surface of the other transparent substrate,
wherein a plurality of pixel regions corresponding to the pixel electrodes are formed in the liquid crystal cell,
a portion of each pixel region having a reflective pixel electrode serves as a reflective portion,
the reflective portion has a reflector that reflects light incident from the other transparent substrate,
the other portion of each pixel region serves as a transmissive portion that transmits light from the other transparent substrate to the one transparent substrate, and
optical characteristics of the liquid crystal cell, the first to fourth retardation plates, and the first and second polarizing plates are set so as to the following conditions:
the direction of an absorption axis c of the first polarizing plate: $(\psi-15°)-30°$ to $(\psi-15°)+30°$;
a retardation value $\Delta nd_{RF2}$ of the second retardation plate: 250 nm to 290 nm;
the direction of a slow axis d of the second retardation plate: $(\psi+60°)-15°$ to $(\psi+60°)+15°$;
a retardation value $\Delta nd_{RF1}$ of the first retardation plate: 80 nm to 120 nm;
the direction of a slow axis e of the first retardation plate: $(\psi-15°)$ to $(\psi+15°)$;
a twist angle $\phi$ of the liquid crystal layer: 0° to 40°;
a retardation value $\Delta nd_{LT}$ of the transmissive portion of the liquid crystal cell which is set to satisfy the following expression 7:

$$|\Delta nd_{LT} - 550\sqrt{(1/2)^2 + (\phi/180)^2}| \leq 100 (nm);$$ [Expression 7]

a retardation value $\Delta_{ndLR}$ of the reflective portion of the liquid crystal cell which is set to satisfy the following expression 8:

$$|\Delta nd_{LR} - 550\sqrt{(1/4)^2 + (\phi/180)^2}| \leq 40 (nm);$$ [Expression 8]

a retardation value $\Delta nd_{RF3}$ of the third retardation plate: 80 nm to 120 nm;
the direction of a slow axis f of the third retardation plate: $(\psi-15°)$ to $(\psi+15°)$;
a retardation value $\Delta nd_{RF4}$ of the fourth retardation plate: 250 nm to 290 nm;
the direction of a slow axis g of the fourth retardation plate: $(\psi-60°)-15°$ to $(\psi-60°)+15°$; and
the direction of an absorption axis h of the second polarizing plate: $(\psi-75°)-30°$ to $(\psi-75°)+30°$, where, when the alignment direction of the alignment film formed on the one transparent substrate is a direction a, the alignment direction of the alignment film formed on the other transparent substrate is a direction b, and the a direction that divides a narrow angle formed between the directions a and b into two equal angles is a center direction $\psi$, $\psi \pm N°$ (N is an integer) indicates the directions of each axis indicates, that is, positive and negative angles N with respect to the center direction $\psi$,
$\psi-N°$ indicates an angle rotating on an intersecting point O from the center direction $\psi$ by an angle of $N°$ in the clockwise direction, as viewed from the one transparent substrate, and
$\psi+N°$ indicates an angle rotating on the intersecting point O from the center direction $\psi$ by an angle of $N°$ in the counter clockwise direction, as viewed from the one transparent substrate.

23. The liquid crystal display device according to claim 22,
wherein the pixel electrode in the reflective portion is the reflective pixel electrode composed of a metal film, and the pixel electrode in the transmissive portion is a transmissive pixel electrode composed of a transparent conductive film.

24. The liquid crystal display device according to claim 22,
wherein color filters are provided between the one transparent substrate and the common electrode, and
the thickness of the color filter in the reflective portion is smaller than that of the color filter in the transmissive portion.

25. The liquid crystal display device according to claim 22,
wherein color filters are provided between the one transparent substrate and the common electrode,
the thickness of the color filter in the reflective portion is smaller than that of the color filter in the transmissive portion, and
a transparent resin layer is formed on a surface of each color filter facing the liquid crystal layer in the reflective portion, so that the total thickness of the color filter and the transparent resin layer in the reflective portion is equal to the thickness of the color filter in the transmissive portion.

26. The liquid crystal display device according to claim 22,
wherein the thickness of the liquid crystal layer in the transmissive portion is about two times the thickness of the liquid crystal layer in the reflective portion.

27. The liquid crystal display device according to claim 22,
wherein the pixel electrode in the reflective portion is the reflective pixel electrode composed of a metal film, and the pixel electrode in the transmissive portion is a transmissive pixel electrode composed of a transparent conductive film,
a step portion of the reflector is arranged adjacent to the transmissive pixel electrode, and
an inclination angle of the step portion is set in a range of 25° to 55°.

28. The liquid crystal display device according to claim 22,
wherein the twist angle of the liquid crystal layer is set in a range of 0° to 30°.

* * * * *